(12) United States Patent
Chen

(10) Patent No.: US 11,889,072 B2
(45) Date of Patent: Jan. 30, 2024

(54) VIDEO ENCODING AND DECODING

(71) Applicant: HANGZHOU HIKVISION DIGITAL TECHNOLOGY CO., LTD., Hangzhou (CN)

(72) Inventor: Fangdong Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 340 days.

(21) Appl. No.: 17/358,368

(22) Filed: Jun. 25, 2021

(65) Prior Publication Data

US 2021/0321102 A1 Oct. 14, 2021

Related U.S. Application Data

(63) Continuation of application No. PCT/CN2019/124453, filed on Dec. 11, 2019.

(30) Foreign Application Priority Data

Dec. 28, 2018 (CN) .......................... 201811628695.2

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/139* (2014.11);
(Continued)

(58) Field of Classification Search
CPC .. H04N 19/119; H04N 19/105; H04N 19/139; H04N 19/174; H04N 19/176;
(Continued)

(56) References Cited

U.S. PATENT DOCUMENTS 6,208,690 B1 3/2001 Tomizawa
6,879,324 B1 4/2005 Hoppe
(Continued)

FOREIGN PATENT DOCUMENTS

CN 1195255 10/1998
CN 101502119 8/2009
(Continued)

OTHER PUBLICATIONS

Bross et al., "Versatile Video Coding (Draft 3)" Joint Video Experts Team of ITU-T SG 16 WP 3 and ISO/IEC JTC 1/SC 29/WG 11, 12th meeting, Macao, CN, Oct. 3-12, 2018, 225 pages.
(Continued)

*Primary Examiner* — Dominic D Saltarelli
(74) *Attorney, Agent, or Firm* — Fish & Richardson P.C.

(57) ABSTRACT

The present disclosure provides a video encoding and decoding method and a video encoding and decoding device. The method includes: partitioning the current block into a first triangular sub-block and a second triangular sub-block when a current block satisfies specific conditions for enabling a geometric partitioning mode with triangular partition and the geometric partitioning mode with triangular partition is determined to be enabled; obtaining first target motion information of the first triangle sub-block and second target motion information of the second triangle sub-block, wherein the first target motion information is different from the second target motion information; and performing an encoding processing or a decoding processing on the current block based on the first target motion information and the second target motion information.

20 Claims, 6 Drawing Sheets

US 11,889,072 B2
Page 2

(51) Int. Cl.
   *H04N 19/139* (2014.01)
   *H04N 19/174* (2014.01)
   *H04N 19/176* (2014.01)
   *H04N 19/52* (2014.01)
   *H04N 19/147* (2014.01)
   *H04N 19/184* (2014.01)
   *H04N 19/186* (2014.01)

(52) U.S. Cl.
   CPC ......... *H04N 19/174* (2014.11); *H04N 19/176* (2014.11); *H04N 19/52* (2014.11); *H04N 19/147* (2014.11); *H04N 19/184* (2014.11); *H04N 19/186* (2014.11)

(58) Field of Classification Search
   CPC .... H04N 19/52; H04N 19/147; H04N 19/184; H04N 19/186
   USPC .................................................. 375/240.12
   See application file for complete search history.

(56) References Cited

U.S. PATENT DOCUMENTS

| | | | |
|---|---|---|---|
| 9,641,860 | B2 | 5/2017 | Oh et al. |
| 11,159,793 | B2* | 10/2021 | Ahn ........................ H04N 19/96 |
| 2002/0126116 | A1 | 9/2002 | Grzeszczuk et al. |
| 2006/0133484 | A1 | 6/2006 | Park et al. |
| 2011/0200097 | A1 | 8/2011 | Chen et al. |
| 2015/0023426 | A1 | 1/2015 | Yie et al. |
| 2018/0109795 | A1 | 4/2018 | Stava et al. |
| 2018/0146192 | A1 | 5/2018 | Tao et al. |
| 2021/0160507 | A1* | 5/2021 | Kim ........................ H04N 19/96 |
| 2021/0185353 | A1* | 6/2021 | Xiu ........................ H04N 19/583 |
| 2021/0368172 | A1* | 11/2021 | Lim ........................ H04N 19/96 |

FOREIGN PATENT DOCUMENTS

| | | |
|---|---|---|
| CN | 101873500 | 10/2010 |
| CN | 102075748 | 5/2011 |
| CN | 102215395 | 10/2011 |
| CN | 102223526 | 10/2011 |
| CN | 102223528 | 10/2011 |
| CN | 102611881 | 7/2012 |
| CN | 102648631 | 8/2012 |
| CN | 102763415 | 10/2012 |
| CN | 102823244 | 12/2012 |
| CN | 103281527 | 9/2013 |
| CN | 103339935 | 10/2013 |
| CN | 103686165 | 3/2014 |
| CN | 103733624 | 4/2014 |
| CN | 102611884 | 7/2014 |
| CN | 102611880 | 2/2015 |
| CN | 104717513 | 6/2015 |
| CN | 104768005 | 7/2015 |
| CN | 104935938 | 9/2015 |
| CN | 106105199 | 11/2016 |
| CN | 106294918 | 1/2017 |
| CN | 106375764 | 2/2017 |
| CN | 106375765 | 2/2017 |
| CN | 108293125 | 7/2018 |
| CN | 109819255 | 5/2019 |
| CN | 109862368 | 6/2019 |
| CN | 109862369 | 6/2019 |
| CN | 109923866 | 6/2019 |
| CN | 110312130 | 10/2019 |
| JP | H1093975 | 4/1998 |
| JP | H10294942 | 11/1998 |
| KR | 20180061060 | 6/2018 |
| RU | 2604330 | 12/2016 |
| WO | 2017192011 | 11/2017 |
| WO | 2018012886 | 1/2018 |
| WO | 2018016823 | 1/2018 |
| WO | 20181284661 | 7/2018 |

OTHER PUBLICATIONS

Office Action in Canada Appln. No. 3124889, dated Sep. 15, 2022, 11 pages.
Office Action in Japanese Appln. No. 2021-537882, dated Aug. 8, 2022, 12 pages (with English translation).
Office Action in Singapore Appln. No. 11202106972T, dated Nov. 9, 2022, 11 pages.
AU Office Action issued in Australian Appln. No. 2019416266, dated May 4, 2022, 3 pages.
RU Office Action issued in Russian Appln. No. 2022119590, dated Jul. 21, 2022, 6 pages (with English Translation) .
Chen et al., "Two-Stage Picture Padding for High Efficiency Video Coding", Picture Coding Symposium, Dec. 2016, 5 pages.
CN Office Action issued in Chinese Appln. No. 201910104281.8, dated Dec. 19, 2019, 10 pages (With English Translation).
CN Office Action issued in Chinese Appln. No. 201910104281.8, dated Aug. 14, 2019, 10 pages (With English Translation).
CN Office Action issued in Chinese Appln. No. 201910104299.8, dated Aug. 14, 2019, 11 pages (With English Translation).
CN Office Action issued in Chinese Appln. No. 201910104323.8, dated Aug. 14, 2019, 10 pages (With English Translation).
Feng, "Research on HEVC Inter Frame Predictive Coding", Hainan university (Social Science Edition), vol. 37, No. 3, May 2017, 59 pages (With English Abstract).
Liao et al., "CE10.3.1.b: Triangular prediction unit mode" Joint Video Exploration Team (JVET) of ITU-T SG 16 WP 3 and ISO/IEC JTC 1/SC 29/WC 11 12th Meeting: Macao, Oct. 2018, 8 pages.
Mei-Feng et al., "A HEVC Video Coding Algorithm Based on Triangle Motion Block", Journal of East China Institute of Technology, vol. 37 No. 3, Sep. 2014, 6 pages (With English Abstract).
PCT International Search Report in International Appln. No. PCT/CN2019/124453, dated Mar. 12, 2020, 5 pages (With English Translation).
PCT International Search Report in International Appln. No. PCT/CN2019/124455, dated Mar. 12, 2020, 4 pages (With English Translation).
PCT International Search Report in International Appln. No. PCT/CN2019/124458, dated Mar. 12, 2020, 4 pages (With English Translation).
PCT International Search Report in International Appln. No. PCT/CN2019/124461, dated Mar. 12, 2020, 4 pages (With English Translation).
CN Office Action issued in Chinese Appln. No. 201811628695.2, dated Aug. 13, 2021, 22 pages (With English Translation).
CN Office Action issued in Chinese Appln. No. 202011480759.6, dated Sep. 18, 2021, 19 pages (With English Translation).
CN Office Action issued in Chinese Appln. No. 202011480768.5, dated Aug. 27, 2021, 21 pages (With English Translation).
CN Office Action issued in Chinese Appln. No. 202011480770.2, dated Aug. 27, 2021, 21 pages (With English Translation).
CN Office Action issued in Chinese Appln. No. 202011480776.X, dated Sep. 9, 2021, 20 pages (With English Translation).
CN Office Action issued in Chinese Appln. No. 202011480792.9, dated Aug. 13, 2021, 21 pages (With English Translation).
CN Office Action issued in Chinese Appln. No. 202011480801.4, dated Aug. 13, 2021, 20 pages (With English Translation).
CN Office Action issued in Chinese Appln. No. 202011480803.3, dated Sep. 8, 2021, 19 pages (With English Translation).
CN Office Action issued in Chinese Appln. No. 202011480817.5, dated Aug. 23, 2021, 21 pages (With English Translation).
CN Office Action issued in Chinese Appln. No. 202011480862.0, dated Sep. 18, 2021, 21 pages (With English Translation).
CN Office Action issued in Chinese Appln. No. 202011480872.4, dated Sep. 22, 2021, 20 pages (With English Translation).
CN Office Action issued in Chinese Appln. No. 202011480919.7, dated Aug. 23, 2021, 21 pages (With English Translation).
CN Office Action issued in Chinese Appln. No. 202011483940.2, dated Aug. 13, 2021, 20 pages (With English Translation).
CN Office Action issued in Chinese Appln. No. 202011483957.8, dated Sep. 14, 2021, 21 pages (With English Translation).

(56) References Cited

OTHER PUBLICATIONS

CN Office Action issued in Chinese Appln. No. 202011483959.7, dated Aug. 24, 2021, 21 pages (With English Translation).
CN Office Action issued in Chinese Appln. No. 202011484003.9, dated Aug. 24, 2021, 21 pages (With English Translation).
CN Office Action issued in Chinese Appln. No. 202011484020.2, dated Sep. 9, 2021, 21 pages (With English Translation).
CN Office Action issued in Chinese Appln. No. 202011484037.8, dated Aug. 23, 2021, 21 pages (With English Translation).
CN Office Action issued in Chinese Appln. No. 202011484039.7, dated Aug. 24, 2021, 21 pages (With English Translation).
CN Office Action issued in Chinese Appln. No. 202011484041.4, dated Sep. 23, 2021, 21 pages (With English Translation).
CN Office Action issued in Chinese Appln. No. 202011484057.5, dated Aug. 27, 2021, 21 pages (With English Translation).
CN Office Action issued in Chinese Appln. No. 202011484121.X, dated Sep. 8, 2021, 21 pages (With English Translation).
CN Office Action issued in Chinese Appln. No. 202011484132.8, dated Aug. 23, 2021, 21 pages (With English Translation).
CN Office Action issued in Chinese Appln. No. 202011480780.6, dated Sep. 23, 2021, 21 pages (With English Translation).
Ning Yan et al., "Diagonal Motion Partitions for Inter Prediction in HEVC", 2016 Visual Communications and Image Processing (VCIP), Jan. 5, 2017, 4 pages.
PCT International Written Opinion in International Appln. No. PCT/CN2019/124453, dated Mar. 12, 2020, 10 pages (With English Translation).
PCT International Written Opinion in International Appln. No. PCT/CN2019/124455, dated Mar. 12, 2020, 8 pages (With English Translation).
PCT International Written Opinion in International Appln. No. PCT/CN2019/124458, dated Jun. 2, 2021, 10 pages (With English Translation).
PCT International Written Opinion in International Appln. No. PCT/CN2019/124461, dated Mar. 12, 2020, 10 pages (With English Translation).
Yuan et al., "A New Transform Structure for Geometry Motion Partitioning in Video Coding", Journal of Shanghai University (Natural Science), Jun. 30, 2013, 5 pages (English Abstract).
Ahn et al., "CE10-related: Diagonal motion partitions on top of MTT block structure, (JVET) of ITU-T SG 16 WP 3 and ISO/IEC JTC 1/SC 29/WG 11" JVET-K0270, 11th Meeting: Ljubljana, Jul. 10-18, 2018, 9 pages.
CN Office Action issued in Chinese Appln. No. 202011480779.3, dated Dec. 2, 2021, 18 pages (With English Translation).
CN Office Action issued in Chinese Appln. No. 202011483975.6, dated Feb. 22, 2022, 23 pages (With English Translation).
CN Office Action issued in Chinese Appln. No. 202011484110.1, dated Dec. 2, 2021, 18 pages (With English Translation).
IN Office Action Issued in Indian Appln. No. 202127028897, dated Mar. 29, 2022, 7 pages (With English Translation).
RU Office Action issued in Russian Appln. No. 2021118628, dated Feb. 4, 2022, 14 pages (With English Translation).
Chen et al., "CE10-related: Simplified triangle prediction unit mode" Joint Video Experts Team (JVET) of ITU-T SG 16 WP 3 and ISO/IEC JTC 1/SC 29/WG 11, 13th Meeting: Marrakech, MA, Jan. 9-18, 2019, 8 pages.
CN Office Action issued in Chinese Appln. No. 202011480749.2, dated Dec. 3, 2021, 21 pages (With English Translation).
CN Office Action issued in Chinese Appln. No. 202011480849.5, dated Oct. 9, 2021, 20 pages (With English Translation).
CN Office Action issued in Chinese Appln. No. 202011480851.2, dated Oct. 13, 2021, 20 pages (With English Translation).
CN Office Action issued in Chinese Appln. No. 202011480854.6, dated Oct. 12, 2021, 20 pages (With English Translation).
CN Office Action issued in Chinese Appln. No. 202011480859.9, dated Oct. 9, 2021, 20 pages (With English Translation).
CN Office Action issued in Chinese Appln. No. 202011480874.3, dated Oct. 12, 2021, 20 pages (With English Translation).
CN Office Action issued in Chinese Appln. No. 202011483974.1, dated Dec. 3, 2021, 20 pages (With English Translation).
CN Office Action issued in Chinese Appln. No. 202011484095.0, dated Dec. 3, 2021, 21 pages (with English Translation).
Extended European Search Report issued in European Appln. No. 19902594.1, dated Jan. 18, 2022, 45 pages.
Liao et al., "CE10.3.1.b6: Triangular prediction unit mode" Joint Video Exploration Team (JVET) of ITU-T SG 16 WP 3 and ISO/IEC JTC 1/SC 29/WG 11, 12th Meeting: Macao, CN, Oct. 3-12, 2018, 8 pages.
Yang et al., "Description of Core Experiment 4 (CE4): Inter prediction and motion vector coding" Joint Video Experts Team (JVET) of ITU-T SG 16 WP 3 and ISO/IEC JTC 1/SC 29/WG 11, 13th Meeting: Marrakech, MA, Jan. 9-18, 2019, 15 pages.

\* cited by examiner

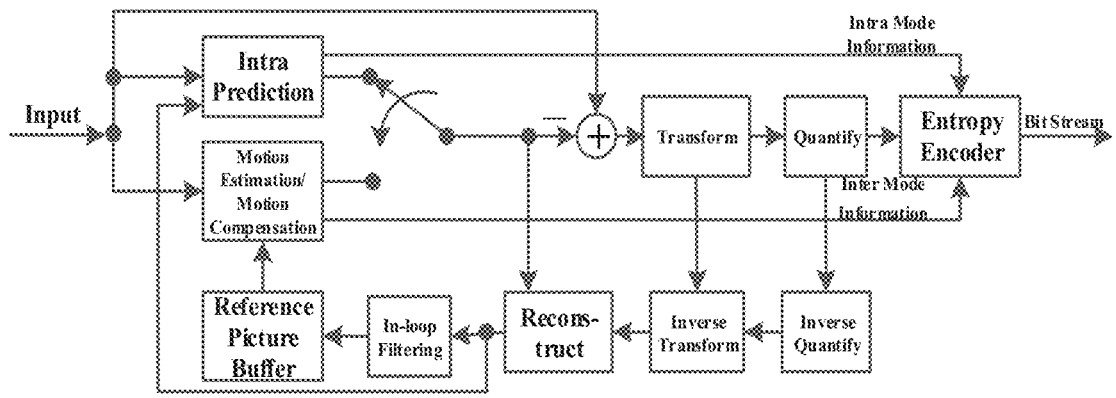

FIG. 1

201
If a current block satisfies conditions for enabling a geometric partitioning mode with triangular partition and it is determined to enable the geometric partitioning mode with triangular partition, the video decoder partitions the current block into a first triangular sub-block and a second triangular sub-block 202
The video decoder obtains first target motion information of the first triangle sub-block and second target motion information of the second triangle sub-block, the first target motion information can be different from the second target motion information.

203
The video decoder decodes the current block based on the first target motion information and the second target motion information

FIG. 2

180
VIDEO ENCODING AND DECODING

CROSS REFERENCE TO RELATED APPLICATIONS

This application is a continuation of PCT International Application No. PCT/CN2019/124453, filed on Dec. 11, 2019, which claims priority to Chinese Patent Application No. 201811628695.2 filed on Dec. 28, 2018. The entire contents of the above referenced applications are incorporated herein by reference for all purposes.

TECHNICAL FIELD

The present disclosure relates to video encoding and decoding, and more particularly, to coding by using geometric partitioning mode with triangular partition.

BACKGROUND

Generally, a video coding method can include processes such as prediction, transformation, quantization, filtering, and entropy coding. Prediction coding can include intra prediction coding and inter prediction coding. Inter prediction coding refers to prediction coding using reconstructed pixel values of a temporal neighboring block of a current block (the temporal neighboring block and the current block are not located in a same picture). Intra prediction coding refers to prediction coding using reconstructed pixel values of a spatial neighboring block of the current block (the spatial neighboring block and the current block are located in a same picture).

In inter prediction coding, a motion vector (MV) can be used to represent a relative displacement between the current block of the current slice and a reference block of the reference picture. For example, the current slice A and the reference picture B have a high time-domain correlation. When a current block A1 of the current slice A needs to be transmitted, a reference block B1 that best matches the current block A1 can be searched for in the reference picture B, and the relative displacement between the current block A1 and the reference block B1 is determined and used as the motion vector of the current block A1.

There can be two different objects in a block corresponding to a physical object edge, such as a foreground (i.e., a physical object) and a background at the same time. In this case, if only a rectangular block is used for prediction, the prediction effect of a certain part of the object in the rectangular block can be undesirable, resulting in a large coding residual.

SUMMARY

The present disclosure provides a video encoding and decoding method, which can be performed by a video encoder or a video decoder, and includes; partitioning a current block into a first triangular sub-block and a second triangular sub-block when the current block satisfies specific conditions for enabling a geometric partitioning mode with triangular partition and the geometric partitioning mode with triangular partition is determined to be enabled; obtaining first target motion information of the first triangle sub-block and second target motion information of the second triangle sub-block, wherein the first target motion information is different from the second target motion information; and performing an encoding processing or a decoding processing on the current block based on the first target motion information and the second target motion information.

The present disclosure provides a video decoder, which includes a processor and a machine-readable storage medium, wherein the machine-readable storage medium stores machine-executable instructions that are invoked by the processor: when the processor executes the instructions, the processor is caused to perform the video encoding and decoding method.

The present disclosure provides a video encoder, which includes a processor and a machine-readable storage medium, wherein the machine-readable storage medium stores machine-executable instructions that are invoked by the processor; when the processor executes the instructions, the processor is caused to perform the video encoding and decoding method.

BRIEF DESCRIPTION OF THE DRAWINGS

FIG. 1 is a schematic diagram of a framework of a video encoding system according to an example of the present disclosure.

FIG. 2 is a flowchart of a video decoding method according to an example of the present disclosure.

DETAILED DESCRIPTION OF THE EMBODIMENTS

Figure 3:
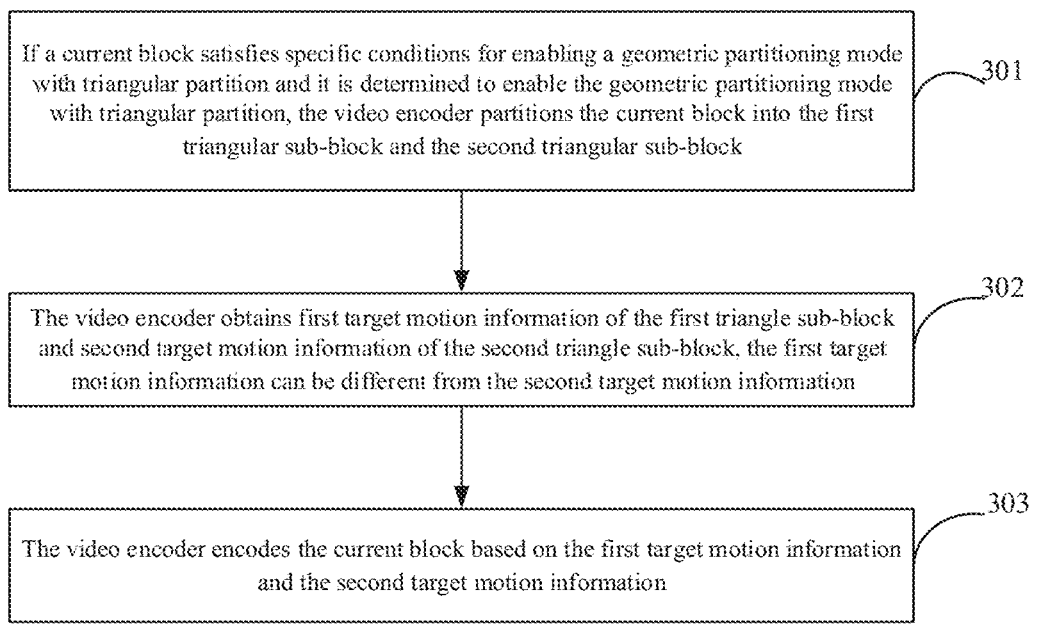
FIG. 3 is a flowchart of a video encoding method according to an example of the present disclosure.

The terms used in the examples of the present disclosure are only for the purpose of describing specific examples, rather than limiting the present disclosure. The singular forms of "a", "said" and "the" used in the present disclosure and claims are also intended to include plural forms, unless the context clearly indicates otherwise. It should also be understood that the term "and/or" as used herein refers to any one or all possible combinations of one or more associated listed items.

It should be understood that although the terms first, second, third, etc. can be used in the examples of the present disclosure to describe various information, these information should not be limited by these terms. These terms are only used to distinguish the same type of information from each other. For example, without departing from the scope of the present disclosure, the first information can also be referred to as second information, and similarly, the second information can also be referred to as first information. In addition, the word "if" used can be interpreted as "upon" or "when" or "in response to".

The examples of the present disclosure can involve the following concepts.

Intra prediction: prediction coding using reconstructed pixel values of a spatial neighboring block (in the same picture as the current block) of a current block. A variety of intra prediction modes have been proposed, and each intra prediction mode except a DC mode corresponds to one texture direction. The predicted pixels of the current block can be generated from boundary reconstruction pixel values of the neighboring block in its prediction direction. For example, if the texture of the image is in horizontal direction, then a horizontal prediction mode can better predict image information.

Inter prediction: prediction coding using reconstructed pixel values of a temporal neighboring block (in a different picture from the current block) of a current block. Part of the inter prediction of main video coding standards adopts a block-based motion compensation technology, in which a best matching block is found in a reference picture for the current block. This process is referred to as Motion Estimation (ME).

Motion Vector (MV). In inter prediction coding, a motion vector is used to represent a relative displacement between a current encoded block and a best matching block in a reference picture. Each block obtained by partition has a corresponding motion vector to be transmitted to a decoder. If the motion vector of each block is encoded and transmitted independently, especially when smaller-sized blocks are obtained from partition, more bits have to be consumed. In order to reduce the number of bits used to encode the motion vector, spatial correlation between neighboring image blocks can be used in video encoding to predict the motion vector of the current to-be-encoded block based on the motion vector of the neighboring encoded block, and then a prediction difference is encoded. Thus, the number of bits representing the motion vector can be effectively reduced. In the process of encoding the motion vector of the current image block, the motion vector of the neighboring encoded block is generally used to predict the motion vector of the current macroblock, and then a motion vector difference (MVD) between a motion vector prediction (MVP) value and a real estimation value of the motion vector is encoded, thereby effectively reducing the number of encoded bits for the MV.

Motion Information. Since the motion vector represents the displacement of the current image block relative to a block in a reference picture, in order to accurately obtain the information of the indicated image block, in addition to the motion vector, a reference index is also needed to indicate which reference picture is used for the current image block. In video coding technology, for the current slice, a reference picture list can usually be established, and the reference index specifies which reference picture listed in the reference picture list is used by the current image block. In addition, many coding technologies also support multiple reference picture lists, so an index is needed to indicate which reference picture list is used, and this index can be referred to as a reference direction. In video coding technology, coding information related to motion, such as motion vector, reference index, and reference direction, can be collectively referred to as motion information.

Rate distortion optimized (RDO). There are usually two indicators for evaluating video encoding efficiency: bit rate and peak signal to noise ratio (PSNR). The smaller the bit stream is, the larger the compression rate is: the higher the PSNR is, the better the quality of the reconstructed image is. Selection of a mode is usually based on a comprehensive evaluation of the two indicators. For example, the cost corresponding to a mode can be calculated according to the following formula: $J(mode)=D+\lambda*R$, where D represents a distortion, usually measured by a sum of squared differences (SSE) between a reconstructed image block and a source image block; $\lambda$ represents a Lagrangian multiplier: R represents an actual number of bits required for encoding an image block in this mode, including a total number of bits required for encoding mode information, motion information, residuals, etc. Selection decision on the coding mode based on the RDO policy can usually ensure good coding performance.

FIG. 1 schematically shows a framework of a video coding system, which can be used to implement the processing at an encoder according to an example of the present disclosure. The framework of the video coding system can include an intra prediction module, a motion estimation/motion compensation module, a reference picture buffer, an in-loop filtering module, a reconstruction module, a transform module, a quantization module, an inverse transform module, an inverse quantization module, an entropy encoder, etc. Similarly, the framework of the video decoding system corresponding to the framework of the video encoding system can be used to implement the processing at a decoder according to an example of the present disclosure.

Some examples of the present disclosure will be described in detail below with reference to the accompanying drawings.

Implementation 1

FIG. 2 is a flowchart of a video decoding method according to an example of the present disclosure. This method can be applied to a decoder, and can include steps 201 to 203.

Step 201, if a current block satisfies specific conditions for enabling the geometric partitioning mode with triangular partition and it is determined to enable the geometric partitioning mode with triangular partition, the video decoder is configured to partition the current block into a first triangular sub-block and a second triangular sub-block, that is, the current block can be partitioned into two triangular sub-blocks.

Step 202, the video decoder is configured to obtain the first target motion information of the first triangle sub-block and the second target motion information of the second triangle sub-block. The first target motion information can be different from the second target motion information.

Step 203, the video decoder is configured to perform the decoding process of the current block based on the first target motion information and the second target motion information.

In an example, after receiving an encoded bit stream, the video decoder can perform a decoding process of encoded data corresponding to the current block in the received encoded bit stream based on the first target motion information and the second target motion information.

In the example of the present disclosure, if a current block satisfies specific conditions for enabling the geometric partitioning mode with triangular partition and it is determined to enable the geometric partitioning mode with triangular partition, the current block is partitioned into the first triangular sub-block and the second triangular sub-block. Therefore, the current block can be predicted based on the first target motion information of the first triangle sub-block and the second target motion information of the second triangle sub-block. Therefore, prediction accuracy, prediction performance and coding performance can be improved, and coding residuals can be reduced.

Implementation 2

Referring to FIG. 3, which is a flowchart of a video encoding method according to an example of the present disclosure. The method can be applied to an encoder and can include steps 301 to 303.

Step 301, if a current block satisfies specific conditions for enabling the geometric partitioning mode with triangular partition and it is determined to enable the geometric partitioning mode with triangular partition, the video encoder is configured to partition the current block into the first triangular sub-block and the second triangular sub-block, that is, the current block can be partitioned into two triangular sub-blocks.

Step 302, the video encoder is configured to obtain the first target motion information of the first triangle sub-block and the second target motion information of the second triangle sub-block. The first target motion information can be different from the second target motion information.

Step 303, the video encoder is configured to encode the current block based on the first target motion information and the second target motion information.

In an example, the video encoder can encode the bit stream corresponding to the current block based on the first target motion information and the second target motion information to obtain an encoded bit stream.

In the example of the present disclosure, if a current block satisfies specific conditions for enabling the geometric partitioning mode with triangular partition and it is determined to enable the geometric partitioning mode with triangular partition, the current block is partitioned into the first triangular sub-block and the second triangular sub-block. Therefore, the current block can be predicted based on first target motion information of the first triangle sub-block and second target motion information of the second triangle sub-block. Therefore, prediction accuracy, prediction performance and coding performance can be improved, and coding residuals can be reduced.

Implementation 3

At step 201 and step 301, the video decoder/video encoder is configured to determine whether the current block satisfies specific conditions for enabling the geometric partitioning mode with triangular partition; if so, the current block is partitioned into the first triangular sub-block and the second triangular sub-block: and if not, the current block is not partitioned into the first triangle sub-block and the second triangle sub-block. Determining whether the current block satisfies the specific conditions can include the steps of: determining whether the slice type of a current slice where the current block is located, the motion information mode of the current block, and size information of the current block satisfy the specific conditions.

For example, if the slice type of the current slice is a B slice or a non-I slice, it can be determined that the slice type satisfies the specific conditions. Alternatively, if the slice type of the current slice allows intra block copy, it can be determined that the slice type satisfies the specific conditions.

In an example, if a motion information mode of the current block is a general merge mode, it can be determined that the motion information mode satisfies the specific conditions. However, when the motion information mode of the current block is another type of mode (such as Advanced Motion Vector Prediction (AMVP) mode, or the like), it can also be determined that the motion information mode satisfies the specific conditions.

In an example, if the width of the current block is greater than or equal to a first value, and a height of the current block is greater than or equal to a second value, it can be determined that the size information of the current block satisfies the specific conditions. Alternatively, if the width of the current block is greater than or equal to a third value, or the height of the current block is greater than or equal to a fourth value, it can be determined that the size information of the current block satisfies the specific conditions. Alternatively, if the width of the current block is greater than or equal to a fifth value and less than or equal to a sixth value, and the height of the current block is greater than or equal to a seventh value and less than or equal to an eighth value, it can be determined that the size information of the current block satisfies the specific conditions. Alternatively, if the width of the current block is greater than or equal to a ninth value and less than or equal to a tenth value, or the height of the current block is greater than or equal to an eleventh value and less than or equal to a twelfth value, it can be determined that the size information of the current block satisfies the specific conditions. Alternatively, if the width of the current block is greater than or equal to a thirteenth value and less than or equal to a fourteenth value, the height of the current block is greater than or equal to a fifteenth value and less than or equal to a sixteenth value, and an area of the current block is greater than or equal to a seventeenth value and less than or equal to an eighteenth value, it can be determined that the size information of the current block satisfies the specific conditions.

The above values can be set based on experience, such as 8, 16, 32, 64, 128, and so on. In an example, the first value can be 8, the second value can be 8, the third value can be 8, the fourth value can be 8, the fifth value can be 8, the sixth value can be 128, the seventh value can be 8, the eighth value can be 128, the ninth value can be 8, the tenth value can be 32, the eleventh value can be 8, the twelfth value can be 32, the thirteenth value can be 8, the fourteenth value can be 64, the fifteenth value can be 8, the sixteenth value can be 64, the seventeenth value can be 16, and the eighteenth value can be 1024.

Regarding step 201 and step 301, several examples are given below.

Example 1. If the current block satisfies all the following conditions, the current block is partitioned into the first triangle sub-block and the second triangle sub-block; otherwise, the current block is not partitioned into the first triangle sub-block and the second triangle sub-block:

the current slice is a B slice, that is, the current slice allows two reference picture lists:

the motion information mode of the current block is the general merge mode; and the area (width*height) of the current block is greater than or equal to N*N, and N is 8, for example.

Example 2. If the current block satisfies all the following conditions, the current block is partitioned into the first triangle sub-block and the second triangle sub-block; otherwise, the current block is not partitioned into the first triangle sub-block and the second triangle sub-block:

the current slice is a non-I slice, that is, the current slice allows at least one reference picture list:

the motion information mode of the current block is the general merge mode; and the area (width*height) of the current block is greater than or equal to N*N, and N is 8, for example.

Example 3. If the current block satisfies all the following conditions, the current block is partitioned into the first triangle sub-block and the second triangle sub-block: otherwise, the current block is not partitioned into the first triangle sub-block and the second triangle sub-block:

the current slice is a B slice, that is, the current slice allows two reference picture lists;

the motion information mode of the current block is the general merge mode: and the width or height of the current block is greater than or equal to N, and N is 8, for example.

Example 4. If the current block satisfies all the following conditions, the current block is partitioned into the first triangle sub-block and the second triangle sub-block; otherwise, the current block is not partitioned into the first triangle sub-block and the second triangle sub-block:

the current slice is a non-I slice, that is, the current slice allows at least one reference picture list;

the motion information mode of the current block is the general merge mode; and the width or height of the current block is greater than or equal to N, and N is 8, for example.

Example 5. If the current block satisfies all the following conditions, the current block is partitioned into the first triangle sub-block and the second triangle sub-block: otherwise, the current block is not partitioned into the first triangle sub-block and the second triangle sub-block:

the current slice is a non-I slice, that is, the current slice allows at least one reference picture list;

the motion information mode of the current block is the general merge mode;

the width or height of the current block is greater than or equal to N. N is 8, for example: and the width or height of the current block is less than or equal to M, and M is 128, for example.

Example 6. If the current block satisfies all the following conditions, the current block is partitioned into the first triangle sub-block and the second triangle sub-block: otherwise, the current block is not partitioned into the first triangle sub-block and the second triangle sub-block:

the current slice is a non-I slice, that is, the current slice allows at least one reference picture list;

the motion information mode of the current block is the general merge mode;

the width or height of the current block is greater than or equal to N, N is 8, for example; and the area (i.e., width*height) of the current block is less than or equal to M*M, and M is 32, for example.

Example 7. If the current block satisfies all the following conditions, the current block is partitioned into the first triangle sub-block and the second triangle sub-block; otherwise, the current block is not partitioned into the first triangle sub-block and the second triangle sub-block:

the current slice is a non-I slice, that is, the current slice allows at least one reference picture list:

the motion information mode of the current block is the general merge mode;

the width of the current block is within a range of [Wmin, Wmax], Wmin is for example 8, and Wmax is for example 64;

the height of the current block is within a range of [Hmin, Hmax]. Hmin is for example 8, Hmax is for example 64; and the area (i.e., width*height) of the current block is within the range of [Smin, Smax]. Smin is 16, for example, and Smax is 1024, for example.

Example 8. For any of Examples 1 to 7, the restriction on the slice type can be modified to: the current slice allows intra block copy (that is, allows to search for blocks similar to the current block in the reconstructed blocks of the current slice that have been decoded). For example, for Example 1, the listed conditions can become:

the current slice allows intra block copy:

the motion information mode of the current block is the general merge mode; and the area (width*height) of the current block is greater than or equal to N*N, and N is 8, for example.

Example 9. For any of Examples 1 to 8, the restriction on the motion information mode can be modified to: the motion information mode of the current block is the general merge mode, and not any of a sub-block partition mode, a multi-hypothesis mode, and a general merge mode of coding motion information difference. That is to say, when any one of the sub-block partition mode, multi-hypothesis mode, the general merge mode of coding motion information difference is enabled for the current block, it is determined that the current block does not satisfy the specific conditions, and thus the current block is not partitioned into the first triangle sub-block and the second triangle sub-block.

Implementation 4

Figure 4A:
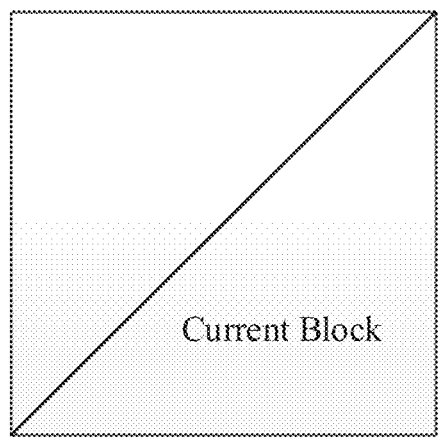
FIGS. 4A to 4B are schematic diagrams of partitioning a current block according to an example of the present disclosure.
Figure 4B:
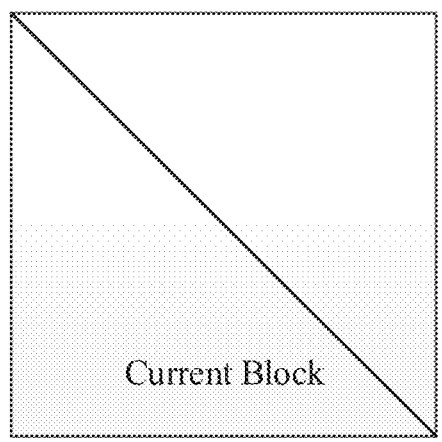

At step 201 and step 301, if the current block satisfies the specific conditions for enabling the geometric partitioning mode with triangular partition and it is determined to enable the geometric partitioning mode with triangular partition, the video decoder/video encoder is configured to partition the current block into the first triangular sub-block and the second triangular sub-block. In an example, that the current block can be partitioned into the first triangle sub-block and the second triangle sub-block with a first diagonal method (that is, using a diagonal that forms an acute angle (for example, a 45-degree angle) with the horizontal and right direction), such as shown in FIG. 4A. Alternatively, the current block can be partitioned into the first triangular sub-block and the second triangular sub-block with a second diagonal method (that is, using a diagonal with an obtuse angle (for example, a 135-degree angle) from the horizontal and right direction), as shown in FIG. 4B.

For example, at the decoder/encoder, the current block can be partitioned into the first triangle sub-block and the second triangle sub-block through the following approaches.

Approach 1. The video encoder agrees to partition the current block with the first diagonal method by default through protocol agreement, and the video decoder agrees to partition the current block with the first diagonal method by default through protocol agreement. On this basis, the video encoder is configured to partition the current block into the first triangle sub-block and the second triangle sub-block with the first diagonal method, and the video decoder is configured to partition the current block into the first triangle sub-block and the second triangle sub-block with the first diagonal method.

Approach 2. The video encoder agrees to partition the current block with the second diagonal method by default through protocol agreement, and the video decoder agrees to partition the current block with the second diagonal method by default through protocol agreement. On this basis, the video encoder is configured to partition the current block into the first triangle sub-block and the second triangle sub-block with the second diagonal method, and the video decoder is configured to partition the current block into the first triangle sub-block and the second triangle sub-block with the second diagonal method.

Approach 3. The video encoder is configured to determine a rate distortion cost 1 corresponding to the partition with the first diagonal method and a rate distortion cost 2 corresponding to the partition with the second diagonal method. If the rate distortion cost 1 is less than the rate distortion cost 2, the video encoder is configured to partition the current block into the first triangle sub-block and the second triangle sub-block with the first diagonal method. The encoded bit stream sent by the video encoder to the decoder carries first indication information, and the first indication information specifies that the current block is partitioned with the first diagonal method. The video decoder is configured to derive the encoded bit stream from the encoder, and if the encoded bit stream carries the first indication information, the current block is partitioned into the first triangle sub-block and the second triangle sub-block with the first diagonal method. On the other hand, if the rate distortion cost 1 is greater than the rate distortion cost 2, the video encoder partitions the current block into the first triangular sub-block and the second triangular sub-block with the second diagonal method. The encoded bit stream sent by the video encoder to the decoder carries second indication information, and the second indication information specifies that the current block is partitioned with the second diagonal method. The video decoder is configured to derive the encoded bit stream from the encoder, and if the encoded bit stream carries the second indication information, the current block is partitioned into the first triangle sub-block and the second triangle sub-block with the second diagonal method.

Implementation 5

At step 202 and step 302, the video decoder/video encoder can obtain the first target motion information of the first triangle sub-block and the second target motion information of the second triangle sub-block through the following approaches.

Approach 1. A first candidate motion information list is constructed, and the first candidate motion information list can include a plurality of candidate motion information; one candidate motion information is selected from the first candidate motion information list as the first target motion information of the first triangle sub-block. The first target motion information is excluded from the first candidate motion information list, and another candidate motion information is selected from the remaining candidate motion information in the first candidate motion information list as the second target motion information of the second triangle sub-block. In this way, it can be ensured that the first target motion information is different from the second target motion information.

In an example, in order to construct the first candidate motion information list, candidate blocks corresponding to the current block can be obtained, and the motion information of the candidate blocks can be added to the first candidate motion information list. If a candidate block is a unidirectional prediction block, the motion information of the candidate block includes unidirectional motion information of the candidate block; if a candidate block is a bidirectional prediction block, the motion information of the candidate block includes first motion information of the candidate block (that is, L0 motion information of the candidate block) and second motion information of the candidate block (that is, L1 motion information of the candidate block), but does not include weighted motion information of the first motion information of the candidate block and the second motion information of the candidate block.

Figure 5A:
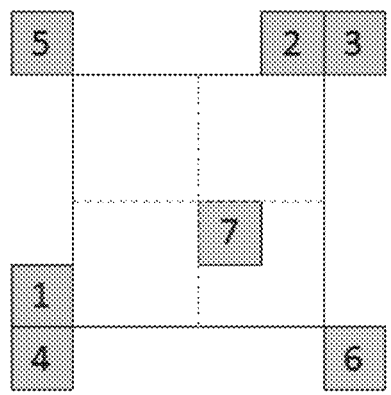
FIGS. 5A to 5C are schematic diagrams of candidate blocks according to an example of the present disclosure.

For example, referring to FIG. 5A, the blocks at the 7 positions shown can be used as candidate blocks corresponding to the current block, where block 1, block 2, block 3, block 4, and block 5 are candidate blocks in the current slice (that is, spatial candidate blocks), and blocks 6 and 7 are candidate blocks in the reference picture (that is, time-domain candidate blocks). The motion information of the candidate blocks at these 7 positions can be collected to construct the first candidate motion information list. If the length of the first candidate motion information list does not reach a preset maximum length MaxL (for example, 7), motion information of several available spatial non-neighboring sub-blocks can be added to the end of the first candidate motion information list (that is, a spatial non-neighboring sub-block is also regarded as a candidate block corresponding to the current block), and the spatial non-neighboring sub-block refers to a sub-block that has no boundary line or boundary point with the current block.

In an example, after the motion information of the candidate blocks are collected, the motion information are sorted in an order of unidirectional motion information, L0 motion information of bidirectional prediction, and L1 motion information of bidirectional prediction, or in an order of L0 motion information of bidirectional prediction, L1 motion information of bidirectional prediction, and unidirectional motion information, and the collected motion information are added to the first candidate motion information list one by one according to the sorting result.

In an example, each time when motion information is added to the first candidate motion information list, it can be determined whether a number of candidate motion information in the first candidate motion information list has reached an upper limit M. If the number has reached the upper limit M, it is rejected to add motion information, and the process of adding motion information is ended. If the number has not reached the upper limit M, it can be continued to add motion information, for example, next motion information is added to the first candidate motion information list after the addition of the current motion information is completed. The value of the upper limit M can be configured based on experience, to be 5, for example.

In an example, each time when motion information is added to the first candidate motion information list, it can be determined whether the motion information is consistent with some motion information which has already exist in the first candidate motion information list. If there is such duplicated motion information in the first candidate motion information list, it is rejected to add the motion information to the first candidate motion information list. If there is no such duplicated motion information, the motion information is added to the first candidate motion information list. In this way, it can duplicated motion information in the first candidate motion information list. Alternatively, it is also possible not to determine whether the to-be-added motion information duplicates with some existing motion information in the first candidate motion information list, but directly add the motion information to the first candidate motion information list.

In an example, when all the collected motion information is added to the first candidate motion information list, the number of candidate motion information in the first candidate motion information list is lower than the upper limit M, then zero motion information can be filled in the first candidate motion information list.

In an example, when the first candidate motion information list is constructed, each time the motion information of the candidate block of the current block is to be collected, there is no need to compare the motion information of the candidate block with the motion information that has been collected for the current block to see whether they are the same, but directly collect the motion information of the candidate block.

In the following, several examples of constructing the first candidate motion information list in Approach 1 will be described.

Example 1. From candidate blocks corresponding to the current block, after obtaining motion information (such as motion vectors) based on the position sequence shown in FIG. 5A, the obtained motion information are sorted in an order of unidirectional motion vector, L0 motion vector of bidirectional prediction, and L1 motion vector of bidirectional prediction (without an average value of L0 motion vector and L1 motion vector of bidirectional prediction), and the obtained motion information are added to the first candidate motion information list one by one according to the sorting result. During the filling process, if the number of candidate motion information in the first candidate motion information list reaches M (for example, 5), filling is stopped. During the filling process, it is necessary to repeatedly check the duplicates to ensure that the first candidate motion information list does not have the same motion information. When the number of candidate motion information is less than M after the filling process is completed, zero motion vectors are filled in.

Example 2. From candidate blocks corresponding to the current block, after obtaining motion information (such as motion vectors) based on the position sequence shown in FIG. 5A, the obtained motion information are sorted in an order of unidirectional motion vector, L0 motion vector of bidirectional prediction, and L1 motion vector of bidirectional prediction (without an average value of L0 motion vector and L1 motion vector of bidirectional prediction), and the obtained motion information are added to the first candidate motion information list one by one according to the sorting result. During the filling process, if the number of candidate motion information in the first candidate motion information list reaches M (for example, 5), filling of motion information is stopped. During the filling process, it is not necessary to check duplicates in the first candidate motion information list. When the number of candidate motion information is less than M after the filling process is completed, zero motion vectors are filled in.

Example 3. From candidate blocks corresponding to the current block, after obtaining motion information (such as motion vectors) based on the position sequence shown in FIG. 5A, the obtained motion information are sorted in an order of L0 motion vector of bidirectional prediction. L1 motion vector of bidirectional prediction, and unidirectional motion vector (without an average value of L0 motion vector and L1 motion vector of the bidirectional prediction), and the obtained motion information are added to the first candidate motion information list one by one according to the sorting result. During the filling process, if the number of candidate motion information in the first candidate motion information list reaches M (for example, 5), filling is stopped. During the filling process, it is necessary to repeatedly check the duplicates to ensure that the first candidate motion information list does not have the same motion information. When the number of candidate motion information is less than M after the filling process is completed, zero motion vectors are filled in.

Example 4. From candidate blocks corresponding to the current block, motion information (such as motion vectors) are obtained based on the position sequence shown in FIG. 5A. If the candidate blocks are unidirectional prediction blocks, that is, unidirectional motion information are used for the candidate blocks, the unidirectional motion information are added to the first candidate motion information list based on the sequence. If the candidate blocks are bidirectional prediction blocks, that is, bidirectional motion information are used for the candidate blocks, either L0 motion information or L1 motion information are added to the first candidate motion information list based on the sequence. During the filling process, if the number of candidate motion information in the first candidate motion information list reaches M (for example, 5), filling is stopped. During the filling process, it is necessary to repeatedly check the duplicates to ensure that the first candidate motion information list does not have the same motion information. When the number of candidate motion information is less than M after the filling process is completed, zero motion vectors are filled in.

Example 5. If a length of the first candidate motion information list constructed after traversing all the candidate blocks shown in FIG. 5A does not reach the preset maximum length MaxL (for example, 7), motion information of several available spatial non-neighboring sub-blocks are added to the end of the first candidate motion information list. Spatial non-neighboring sub-blocks refer to sub-blocks that have no boundary lines or boundary points with the current block.

Example 6. From candidate blocks corresponding to the current block, after obtaining motion information (such as motion vectors) based on the position sequence shown in FIG. 5A, the obtained motion information are sorted in an order of unidirectional motion vector, L0 motion vector of bidirectional prediction, and L1 motion vector of bidirectional prediction (without an average value of the L0 motion vector and L1 motion vector of bidirectional prediction), and the obtained motion information are added to the first candidate motion information list one by one according to the sorting result. During the filling process, if the number of candidate motion information in the first candidate motion information list reaches M (for example, 5), filling of motion information is stopped. During the filling process, for unidirectional motion vector and L0 motion vector of bidirectional prediction, it is necessary to check the duplicates on the existing motion information in the first candidate motion information list to ensure that the first candidate motion information list does not have the same motion information; and for L1 motion vector of bidirectional prediction, it is not necessary to check the duplicates, since the cost is rather high for a huge number of motion information in the first candidate motion information list (because all the motion information in the first candidate motion information list are needed to be compared).

Example 7. When adding motion information to the first candidate motion information list, two processes are involved. One process is the motion information collection process, that is, the motion information of the candidate blocks are collected, and the other process is the motion information adding process, that is, the motion information is added to the first candidate motion information list. An example of the motion information collection process will be described below.

In the process of collecting the motion information of the candidate blocks, it can be determined whether the motion information of the current candidate block is exactly the same as the previously collected motion information. If the motion information of the current candidate block is exactly the same as the previously collected motion information, the process of collecting the motion information of the current candidate block can be skipped. In this example, the motion information of the current candidate block can be compared only with the motion information of the candidate block close to the current candidate block.

For example, referring to FIG. 5A, first, motion information of candidate block 1 is collected. Since candidate block 1 is the first candidate block, no comparison is needed, and the motion information of candidate block 1 is collected directly.

Then, when motion information of candidate block 2 is collected, it can be determined whether candidate block 1 is available. If it is available, it can be determined whether the motion information of candidate block 2 is exactly the same as that of candidate block 1. If they are exactly the same, collection of the motion information of candidate block 2 is not performed, and if they are not the same, collection of the motion information of candidate block 2 is performed.

Then, when collecting motion information of candidate block 3, it can be determined whether candidate block 2 which is close to candidate block 3 is available. If candidate block 2 is available, it can be determined whether the motion information of candidate block 3 and the motion information of candidate block 2 are exactly the same. If they are exactly the same, collection of the motion information of candidate block 3 is not performed, and if they are not the same, collection of the motion information of candidate block 3 is performed. It should be noted that the motion information of candidate block 3 is no longer compared with the motion information of candidate block 1 which is far away from candidate block 3.

Then, when collecting motion information of candidate block 4, it can be determined whether candidate block 1 which is close to candidate block 4 is available. If candidate block 1 is available, it can be determined whether the motion information of candidate block 4 and the motion information of candidate block 1 are exactly the same. If they are exactly the same, collection of the motion information of candidate block 4 is not performed, and if they are not the same, collection of the motion information of candidate block 4 is performed. It should be noted that the motion information of candidate block 4 is no longer compared with the motion information of candidate blocks 2 and 3 which are far away from candidate block 4.

Then, when collecting motion information of candidate block 5, it can be determined whether candidate block 1 which is close to candidate block 5 is available. If candidate block 1 is available, it can be determined whether the motion information of candidate block 5 is exactly the same as that of candidate block 1. If they are exactly the same, the motion information of candidate block 5 is not collected. If they are not the same, it can be determined whether candidate block 2 which is close to candidate block 5 is available. If available, it can be determined whether the motion information of candidate block 5 and the motion information of candidate block 2 are exactly the same. If they are exactly the same, collection of the motion information of candidate block 5 is not performed, and if they are not the same, collection of the motion information of candidate block 5 is performed. It should be noted that the motion information of candidate block 5 is no longer compared with the motion information of the candidate blocks 3 and 4 which are far away from candidate block 5.

Example 8. In the process of collecting motion information of the candidate blocks, there is no need to determine whether the motion information of the current candidate block is exactly the same as the previously collected motion information, but the motion information of the current candidate block is directly collected. Even if the motion information of the current candidate block is exactly the same as the previously collected motion information, subsequently, it is possible to perform duplicate checking operations to avoid the same motion information in the first candidate motion information list.

In the following, the process of selecting one candidate motion information from the first candidate motion information list as the first target motion information of the first triangle sub-block in Approach 1 will be described.

Approach a1. The video encoder can set default first target motion information through protocol agreement. For example, the video encoder can set the top candidate motion information in the first candidate motion information list as the first target motion information of the first triangle sub-block by default. The video decoder can set default first target motion information through protocol agreement. For example, the video decoder can set the top candidate motion information in the first candidate motion information list as the first target motion information of the first triangle sub-block by default.

Approach a2. The video encoder can determine a rate distortion cost corresponding to each candidate motion information in the first candidate motion information list, and use the candidate motion information corresponding to the smallest rate distortion cost as the target motion information of the first triangle sub-block. The encoded bit stream sent by the video encoder to the decoder can carry the third indication information, and the third indication information specifies an index value of the first target motion information in the first candidate motion information list. The video decoder is configured to derive the encoded bit stream from the encoder. If the encoded bit stream carries the third indication information, the index value is used to derive the candidate motion information corresponding to the index information from the first candidate motion information list, and the candidate motion information is determined as the first target motion information.

In the following, the process of selecting another candidate motion information from the first candidate motion information list as the second target motion information of the second triangle sub-block in Approach 1 will be described.

Approach b1. The video encoder can set default second target motion information through protocol agreement. For example, the video encoder can set the second-top candidate motion information in the first candidate motion information list as the second target motion information of the second triangle sub-block by default. The video decoder can set default second target motion information through protocol agreement. For example, the video decoder can set the second-top candidate motion information in the first candidate motion information list as the second target motion information of the second triangle sub-block by default.

Approach b2. The video encoder can exclude the first target motion information from the first candidate motion information list (that is, does not select the first target motion information in the first candidate motion information list), and on this basis, the video encoder can determine a rate distortion cost corresponding to each candidate motion information remaining in the first candidate motion information list (that is, the candidate motion information remaining after excluding the first target motion information), and use the candidate motion information corresponding to the minimum rate distortion cost as the second target motion information of the second triangle sub-block. The encoded bit stream sent by the video encoder to the decoder can carry fourth indication information, which specifies an index value of the second target motion information in the first candidate motion information list. The video decoder is configured to derive the encoded bit stream from the encoder. If the encoded bit stream carries the fourth indication information, the index value is used to select the candidate motion information corresponding to the index information from the first candidate motion information list, and then the candidate motion information is determined as the second target motion information.

Implementation 6

At step 202 and step 302, the video decoder/video encoder can obtain the first target motion information of the first triangle sub-block and the second target motion information of the second triangle sub-block through the following approaches.

Approach 2. A second candidate motion information list corresponding to the first triangle sub-block and a third candidate motion information list corresponding to the second triangle sub-block are constructed. The second candidate motion information list includes a plurality of candidate motion information. The third candidate motion information list includes a plurality of candidate motion information. One candidate motion information is selected from the second candidate motion information list as the first target motion information of the first triangle sub-block as the first target motion information of the first triangle sub-block, and one candidate motion information is selected from the third candidate motion information list as the second target motion information of the second triangle sub-block. The first target motion information is different from the second target motion information.

In an example, in order to construct the second candidate motion information list corresponding to the first triangle sub-block, first candidate blocks corresponding to the first triangle sub-block can be obtained, and the motion information of each first candidate block can be added to the second candidate motion information list. If a first candidate block is a unidirectional prediction block, the motion information of the first candidate block includes the unidirectional motion information of the first candidate block, if the first candidate block is a bidirectional prediction block, the motion information of the first candidate block includes first motion information of the first candidate block (that is, L0 motion information of the first candidate block) and/or second motion information of the first candidate block (that is, L1 motion information of the first candidate block), but does not include the weighted motion information of the first motion information of the first candidate block and the second motion information of the first candidate block.

In an example, in order to construct the third candidate motion information list corresponding to the second triangle sub-block, second candidate blocks corresponding to the second triangle sub-block can be obtained, and the motion information of each second candidate block can be added to the third candidate motion information list. If a second candidate block is a unidirectional prediction block, the motion information of the second candidate block includes the unidirectional motion information of the second candidate block; if the second candidate block is a bidirectional prediction block, the motion information of the second candidate block includes first motion information of the second candidate block (that is, L0 motion information of the second candidate block) and/or second motion information of the second candidate block (that is, L1 motion information of the second candidate block), but does not include the weighted motion information of the first motion information of the second candidate block and the second motion information of the second candidate block.

If the current block is partitioned into the first triangle sub-block and the second triangle sub-block with the second diagonal method, the first triangle sub-block is the triangle sub-block on the upper right side, and the second triangle sub-block is the triangle sub-block on the lower left side. On this basis, the first candidate blocks corresponding to the first triangular sub-block can include, but is not limited to: neighboring blocks on the upper side of the current block, and time-domain candidate blocks in pictures other than the current slice. The second candidate blocks corresponding to the second triangular sub-block can include, but is not limited to: neighboring blocks on the left side of the current block, and time-domain candidate blocks in other pictures than the current slice.

Figure 5B:
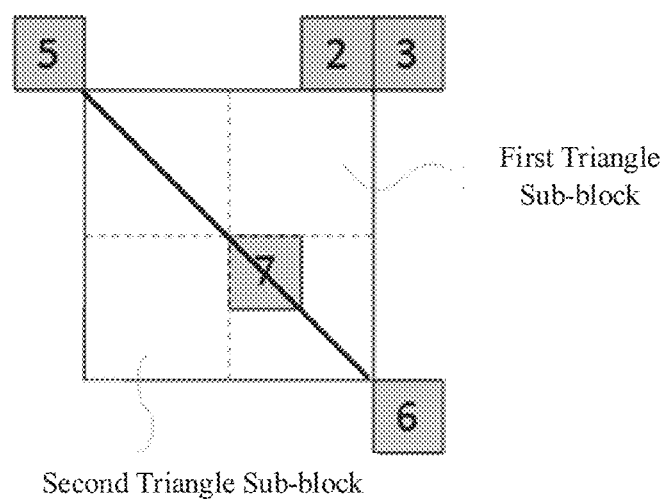

For example, the blocks at 5 positions shown in FIG. 5B can be used as the first candidate blocks corresponding to the first triangular sub-block, where block 2, block 3, and block 5 are candidate blocks in the current slice, and block 6 and block 7 are candidate blocks in other pictures (that is, time-domain candidate blocks). The blocks at 5 positions shown in FIG. 5C can be used as the second candidate blocks corresponding to the second triangle sub-block, where block 1, block 4, and block 5 are candidate blocks in the current slice, and block 6 and block 7 are candidate blocks in other pictures (that is, time-domain candidate blocks).

In an example, motion information of candidate blocks can be collected. If the candidate block is a unidirectional prediction block, the motion information of the candidate block includes the unidirectional motion information of the candidate block; if the candidate block is a bidirectional prediction block, the motion information of the candidate block includes the L0 motion information of the candidate block and/or the L1 motion information of the candidate block, but does not include the weighted motion information of the L0 motion information of the candidate block and the L1 motion information of the candidate block.

Figure 5C:
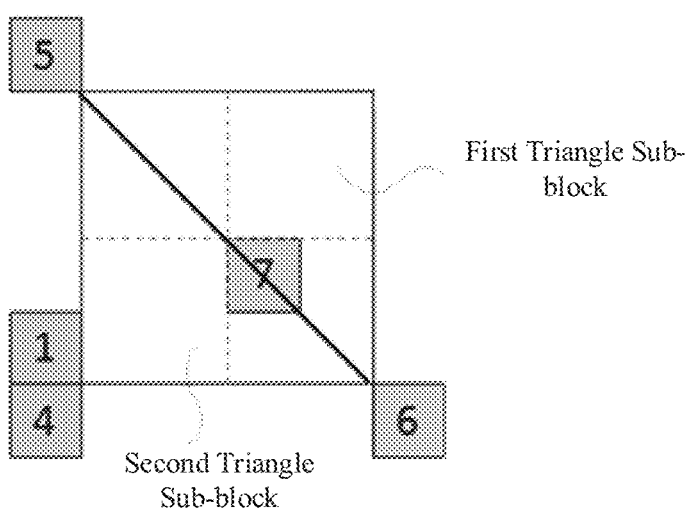

In an example, after the motion information of the candidate blocks (as shown in FIG. 5B or FIG. 5C) are collected, the collected motion information are sorted in an order of unidirectional motion information, L0 motion information of bidirectional prediction, and L1 motion information of bidirectional prediction, and the collected motion information are added to the second candidate motion information list or the third candidate motion information list one by one according to the sorting result. Alternatively, the collected motion information are sorted in an order of L0 motion information of bidirectional prediction, L1 motion information of bidirectional prediction, and unidirectional motion information, and the collected motion information are added to the second candidate motion information list or the third candidate motion information list one by one according to the sorting result.

In an example, each time when motion information is added to the second candidate motion information list or the third candidate motion information list, it can be determined whether a number of candidate motion information in the second candidate motion information list or the third candidate motion information list has reached an upper limit M. If the number has reached the upper limit M, it is rejected to add motion information, and the process of adding motion information is ended: and if the number has not reached the upper limit M, it can be continued to add motion information. After the current motion information is added, the next motion information is added to the second candidate motion information list or the third candidate motion information list. The value of the upper limit M can be 4, for example.

In an example, every time when motion information is added to the second candidate motion information list or the third candidate motion information list, it can be determined whether the motion information is consistent with some motion information which has already exist in the second candidate motion information list or the third candidate motion information list. If there is such duplicated motion information in the second candidate motion information list or the third candidate motion information list, it is rejected to add the motion information to the second candidate motion information list or the third candidate motion information list. If there is no such motion information, the motion information is added to the second candidate motion information list or the third candidate motion information list. In this way, it can avoid duplicated motion information in the second candidate motion information list or the third candidate motion information list. Alternatively, it is also possible not to determine whether the to-be-added motion information duplicates with some existing motion information, but directly add the motion information to the second candidate motion information list or the third candidate motion information list.

In an example, if after all the collected motion information are added to the second candidate motion information list or the third candidate motion information list, the number of candidate motion information in the second candidate motion information list or the third candidate motion information list is lower than the upper limit M, then zero motion information can be filled in the second candidate motion information list or the third candidate motion information list.

In an example, when constructing the second candidate motion information list or the third candidate motion information list, each time the motion information of the candidate block of the current block is to be collected, there is no need to compare the motion information of the candidate block with the motion information that has been collected for the current block to see whether they are consistent, but directly collect the motion information of the candidate block.

It should be noted that the examples 1 to 8 in the above implementation 5 can also be applied to the implementation 6, except that the first candidate motion information list is replaced by the second candidate motion information list or the third candidate motion information list. The candidate block is the candidate block shown in FIG. 5B or FIG. 5C, instead of the candidate block shown in FIG. 5A. The other steps are similar, and details will not be described herein again.

In the following, the process of selecting one candidate motion information from the second candidate motion information list as the first target motion information of the first triangle sub-block in Approach 2 will be described.

Approach c1. The video encoder can set default first target motion information through protocol agreement. For example, the video encoder can set the top candidate motion information in the second candidate motion information list as the first target motion information of the first triangle sub-block by default. The video decoder can set default first target motion information through protocol agreement. For example, the video decoder can set the top candidate motion information in the second candidate motion information list as the first target motion information of the first triangle sub-block by default.

Approach c2. The video encoder can determine a rate distortion cost corresponding to each candidate motion information in the second candidate motion information list, and use the candidate motion information corresponding to the smallest rate distortion cost as the target motion information of the first triangle sub-block. The encoded bit stream sent by the video encoder to the decoder can carry fifth indication information, and the fifth indication information specifies an index value of the first target motion information in the second candidate motion information list. The video decoder is configured to derive the encoded bit stream from the encoder. If the encoded bit stream carries the fifth indication information, the index value indicated by the fifth indication information is used to retrieve the corresponding candidate motion information from the second candidate motion information list, and the candidate motion information is used as the first target motion information.

In the following, the process of selecting one candidate motion information from the third candidate motion information list as the second target motion information of the second triangle sub-block in Approach 2 will be described.

Approach d1. The video encoder can set default second target motion information through protocol agreement. For example, the video encoder can set the top candidate motion information in the third candidate motion information list as the second target motion information of the second triangle sub-block by default. The video decoder can set default second target motion information through protocol agreement. For example, the decoder can set the top candidate motion information in the third candidate motion information list as the second target motion information of the second triangle sub-block by default.

Approach d2. The video encoder can determine a rate distortion cost corresponding to each candidate motion information in the third candidate motion information list, and use the candidate motion information corresponding to the minimum rate distortion cost as the second target motion information of the second triangle sub-block. The encoded bit stream sent by the video encoder to the decoder can carry sixth indication information, which specifies an index value of the second target motion information in the third candidate motion information list. The video decoder is configured to derive the encoded bit stream from the encoder. If the encoded bit stream carries the sixth indication information, the index value indicated by the sixth indication information is used to retrieve the corresponding candidate motion information from the third candidate motion information list, and then the candidate motion information is used as the second target motion information.

Implementation 7

If the current block is partitioned into the first triangle sub-block and the second triangle sub-block with the first diagonal method at step 201/step 301, then at step 202/step 302, the first candidate motion information list can be constructed and the first target motion information and the second target motion information are determined based on the first candidate motion information list, that is, Implementation 5 can be adopted. If the current block is partitioned into the first triangle sub-block and the second triangle sub-block with the second diagonal method at step 201/step 301, then at step 202/step 302, a second candidate motion information list corresponding to the first triangle sub-block and a third candidate motion information list corresponding to the second triangle sub-block can be constructed, the first target motion information is determined based on the second candidate motion information list and the second target motion information is determined based on the third candidate motion information list, that is, Implementation 6 can be adopted.

In an example, no matter whether the current block is partitioned with the first diagonal method or the current block is partitioned with the second diagonal method, Implementation 5 can be adopted. In another example, if the current block is partitioned with the first diagonal method, that is, the current block is partitioned in a 45-degree direction, implementation 5 can be adopted, and the upper limit M is 4, for example. If the current block is partitioned with the second diagonal method, that is, the current block is partitioned in a 135 degree direction, Implementation 6 can be adopted.

Referring to Implementation 6, the first triangle sub-block is a triangle sub-block on the upper right side. As shown in FIG. 5B, the first candidate blocks of the first triangle sub-block are block 2, block 3, block 5, block 6 and block 7 in sequence, that is, block 1 and block 4 that are farther from the first triangle sub-block are excluded. As shown in FIG. 5C, the second candidate blocks of the second triangle sub-block are block 1, block 4, block 5, block 6 and block 7 in sequence, that is, block 2 and block 3 that are farther from the second triangle sub-block are excluded. In addition, the upper limit value M can be 4, for example.

In an example, one flag bit can be encoded to indicate whether the partition is performed in a direction of 45 degrees or 135 degrees. If it is partitioned in a direction of 45 degree, the index of M*(M−1) combinations can be encoded according to the truncated unary code; if it is partitioned in a direction of 135 degrees, the index of M*M combinations can be encoded according to the truncated unary code. In an example, if it is partitioned in a direction of 45 degrees and Implementation 5 is adopted (that is, the first target motion information and the second target motion information are selected from the first candidate motion information list), since there are M (e.g., M is 4) candidate motion information in the first candidate motion information list, the first target motion information has M (e.g., M is 4) possible choices, and after excluding the first target motion information from the first candidate motion information list, the second target motion information has (M−1) possible choices, and therefore, the index of the motion information is an index of M*(M−1) combinations. If it is partitioned in a direction of 135 degrees and Implementation 6 is adopted (that is, the first target motion information is selected from the second candidate motion information list, and the second target motion information is selected from the third candidate motion information list), since there are M (e.g., M is 4) candidate motion information in the second candidate motion information list, the first target motion information has M possible choices, and since there are M (e.g., M is 4) candidate motion information in the third candidate motion information list, the second target motion information has M possible choices, and therefore, the index of the motion information is an index of M*M combinations.

Implementation 8

After the first target motion information of the first triangle sub-block and the second target motion information of the second triangle sub-block are obtained, based on the first target motion information and the second target motion information, motion compensation can be performed on the first triangle sub-block and the second triangle sub-block through the following approaches.

Approach 1. The current block is partitioned into a plurality of sub-blocks, the width of each sub-block can be greater than or equal to 2, and the height of each sub-block is greater than or equal to 2. For each sub-block, if the sub-block is located in the first triangular sub-block, motion compensation is performed on the sub-block based on the first target motion information of the first triangular sub-block to obtain the prediction value of the sub-block; if the sub-block is located in the second triangle sub-block, motion compensation is performed on the sub-block based on the second target motion information of the second triangle sub-block to obtain the prediction value of the sub-block; if the sub-block is neither completely located in the first triangle sub-block nor completely located in the second triangle sub-block (that is, the sub-block is located across the diagonal separating the first triangle sub-block from the second triangle sub-block), weighted compensation is performed on the sub-block based on the first target motion information of the first triangular sub-block and the second target motion information of the second triangle sub-block to obtain the prediction value of the sub-block. The weighted compensation can include the steps of: obtaining a first prediction value of the sub-block based on the first target motion information; obtaining a second prediction value of the sub-block based on the second target motion information; and performing weighted compensation for the sub-block based on the first prediction value, a first weight coefficient corresponding to the first prediction value, the second prediction value, and a second weight coefficient corresponding to the second prediction value.

Figure 6A:
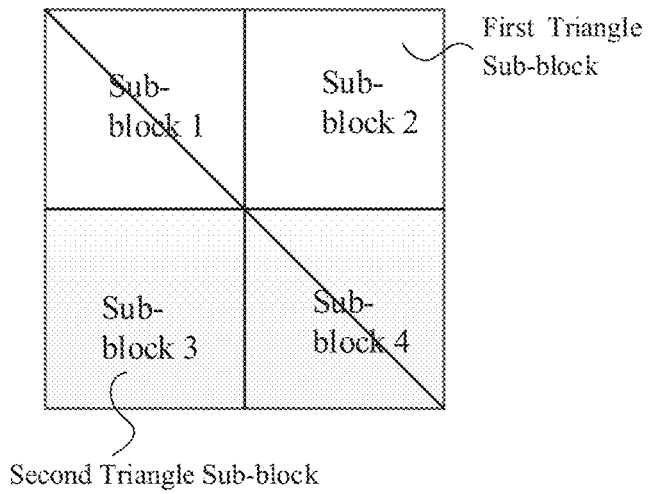
FIGS. 6A to 6C are schematic diagrams of partitioning sub-blocks according to an example of the present disclosure.

For example, referring to FIG. 6A, the current block can be partitioned into sub-block 1, sub-block 2, sub-block 3, and sub-block 4. In practical applications, the current block can be partitioned into more sub-blocks, such as the width of each sub-block is greater than or equal to 2 and the height of each sub-block is greater than or equal to 2. In the following, description will be given with reference to the sub-block partition shown in FIG. 6A as an example.

For sub-block 2, since sub-block 2 is located in the first triangular sub-block, the first target motion information is used to perform motion compensation on sub-block 2 to obtain the prediction value. For sub-block 3, since sub-block 3 is located in the second triangular sub-block, the second target motion information is used to perform motion compensation on sub-block 3 to obtain the prediction value. For sub-block 1, since sub-block 1 is neither completely in the first triangular sub-block nor completely in the second triangular sub-block, a first prediction value P1 of sub-block 1 is determined based on the first target motion information, and a second prediction value P2 of sub-block 1 is determined based on the second target motion information. Assuming that the first weight coefficient corresponding to P1 is a (such as 0.5), and the second weight coefficient corresponding to P2 is b (such as 0.5), then weighted compensation is performed on sub-block 1 based on P1, a, P2, and b. The prediction value of sub-block 1 after weighted compensation is equal to, for example, P1*a+P2*b. The motion compensation for sub-block 4 is similar to the motion compensation for sub-block 1, and will not be repeated here.

Approach 2. The current block is partitioned into a first sub-block area, a second sub-block area, and a third sub-block area, where the first sub-block area is located in the first triangular sub-block, the second sub-block area is located in the second triangle sub-block, and the distance between the center of each sub-block in the third sub-block area and the diagonal separating the first triangle sub-block from the second triangle sub-block is less than a preset threshold. Motion compensation is performed on each sub-block in the first sub-block area based on the first target motion information of the first triangular sub-block, motion compensation is performed on each sub-block in the second sub-block area based on the second target motion information of the second triangular sub-block; and weighted compensation is performed on each sub-block in the third sub-block area based on the first target motion information and the second target motion information. The weighted compensation can include the steps of: for each sub-block in the third sub-block area, determining a first prediction value of the sub-block based on the first target motion information, and determining a second prediction value of the sub-block based on the second target motion information: based on the first prediction value, a first weight coefficient corresponding to the first prediction value, the second prediction value, and a second weight coefficient corresponding to the second prediction value, performing weighted compensation on the sub-block, wherein if the sub-block is located or mostly located in the first triangular sub-block, the first weight coefficient is greater than the second weight coefficient; if the sub-block is located or mostly located in the second triangular sub-block, the first weight coefficient is less than the second weight coefficient; if the sub-block is located across the diagonal separating the first triangular sub-block from the second triangular sub-block, the first weight coefficient is equal to the second weight coefficient.

Each sub-block in the third sub-block area can be a 1*1 sub-block, that is, a single pixel block, or a N*M sub-block, where N can be greater than or equal to 1, and M can also be greater than or equal to 1.

Figure 6B:
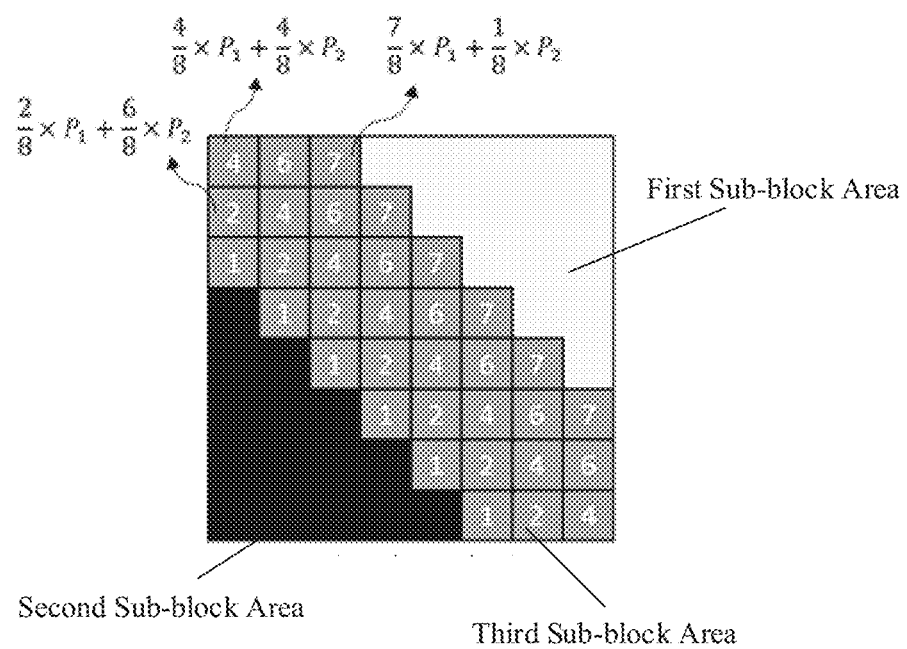

For example, referring to FIG. 6B, the current block can be partitioned into a first sub-block area, a second sub-block area, and a third sub-block area. The first sub-block area is located in the first triangular sub-block, and thus the first target motion information of the first triangular sub-block can be used to perform motion compensation on each sub-block in the first sub-block area to obtain a prediction value. The second sub-block area is located in the second triangle sub-block, and thus the second target motion information of the second triangle sub-block can be used to perform motion compensation on each sub-block in the second sub-block area to obtain a prediction value. The third sub-block area can include sub-blocks labelled 1, sub-blocks labelled 2, sub-blocks labelled 4, sub-blocks labelled 6, and sub-blocks labelled 7.

For each sub-block labelled 7, which will be referred to as sub-block 7 in the following, a first prediction value P1 of sub-block 7 can be determined based on the first target motion information, and a second prediction value P2 of sub-block 7 can be determined based on the second target motion information. Assuming that the first weight coefficient corresponding to P1 is "a", and the second weight coefficient corresponding to P2 is "b", the prediction value of the sub-block 7 after weighted compensation can be equal to: P1*a+P2*b.

Moreover, since the sub-block 7 is located in the first triangular sub-block, the first weight coefficient "a" is greater than the second weight coefficient "b". Assuming that "a" is ⅞ and "b" is ⅛, the prediction value of sub-block 7 after weighted compensation is equal to P1*⅞+P2*⅛.

For each sub-block labelled 6, referred to as sub-block 6 in the following, the weighted compensation process is similar to that of sub-block 7. Since the sub-block 6 is located in the first triangular sub-block, the first weight coefficient "a" is greater than the second weight coefficient "b". In addition, since the sub-block 6 is closer to the second sub-block area than the sub-block 7, the first weight coefficient "a" of the sub-block 6 can be less than the first weight coefficient "a" of the sub-block 7. For example, the first weight coefficient "a" of the sub-block 6 is ⅝, the second weight coefficient "b" is ⅜, and the prediction value of the sub-block 6 after weighted compensation is equal to P1*⅝+P2*⅜.

For each sub-block labelled 4, referred to as sub-block 4 in the following, the weighted compensation process is similar to that of sub-block 7. Since sub-block 4 is located across the diagonal separating the first triangle sub-block from the second triangle sub-block, the first weight coefficient "a" is equal to the second weight coefficient "b". For example, "a" is ⅘, "b" is ⅘, and the prediction value of sub-block 4 after weighted compensation is equal to P1*⅘+P2*⅘.

For each sub-block labelled 2, which will be referred to as sub-block 2 in the following, the weighted compensation process is similar to that of sub-block 7. Since sub-block 2 is located in the second triangular sub-block, the first weight coefficient "a" is less than the second weight coefficient "b". For example, "a" is ⅜, "b" is ⅝, and the prediction value of sub-block 2 after weighted compensation is equal to P1*⅜+P2*⅝.

For each sub-block labelled 1, referred to as sub-block 1 in the following, the weighting compensation process is similar to that for sub-block 7. Since sub-block 1 is located in the second triangular sub-block, the first weight coefficient "a" is less than the second weight coefficient "b". In addition, since sub-block 1 is closer to the second sub-block area than sub-block 2, the first weight coefficient "a" of sub-block 1 can be less than the first weight coefficient "a" of sub-block 2. For example, the first weight coefficient "a" of sub-block 1 is ⅛, and the second weight coefficient "b" is ⅞, and the prediction value of sub-block 1 after weighted compensation is equal to P1*⅛+P2*⅞.

In the above example, the sum of the first weight coefficient "a" and the second weight coefficient "b" of each sub-block is equal to 1. The closer the sub-block is to the first sub-block area, the larger the first weight coefficient "a" is, and the smaller the second weight coefficient "b" is. The closer the sub-block is to the second sub-block area, the smaller the first weight coefficient "a" is, and the larger the second weight coefficient "b" is.

In an example, for the sub-blocks in the third sub-block area, a first set of weight coefficients can be configured for the luma components. For example, along the direction from the first sub-block area to the second sub-block area, the first weight coefficient "a" of the luma component of each sub-block is respectively ⅞, ⅝, ⅘, ⅜, ⅛ in sequence. For example, referring to FIG. 6B, the first weight coefficient "a" of the luma component of sub-block 7 is ⅞, the first weight coefficient "a" of the luma component of sub-block 6 is ⅝, the first weight coefficient "a" of the luma component of sub-block 4 is ⅘, the first weight coefficient "a" of the luma component of sub-block 2 is ⅜, and the first weight coefficient "a" of the luma component of sub-block 1 is ⅛.

In another example, for the sub-blocks in the third sub-block area, a second set of weight coefficients can be configured for the luma components. For example, along the direction from the first sub-block area to the second sub-block area, the first weight coefficient "a" of the luma component of each sub-block is respectively ⅞, ⅝, ⅝, ⅘, ⅜, ⅜, ⅛ in sequence. For example, referring to FIG. 6B, the first weight coefficient "a" of the luma component of sub-block 7 is ⅞, the first weight coefficient "a" of the luma component of sub-block 6 is ⅝, the first weight coefficient "a" of the luma component of sub-block 5 (sub-block 5 can be located between sub-block 4 and sub-block 6, FIG. 6B does not show sub-block 5) is ⅝, the first weight coefficient "a" of the luma component of sub-block 4 is ⅘, the first weight coefficient "a" of the luma component of sub-block 3 (sub-block 3 can be located between sub-block 2 and sub-block 4, and sub-block 3 is not shown in FIG. 6B) is ⅜, the first weight coefficient "a" of the luma component of sub-block 2 is ⅜, and the first weight coefficient "a" of the luma component of sub-block 1 is ⅛. For the abovementioned luma components, the first prediction value P1 and the second prediction value P2 are both the prediction values of luma component, and the prediction value P1*a+P2*b after weighted compensation is also the prediction value of luma component.

In an example, for the sub-blocks in the third sub-block area, a first set of weight coefficients can be configured for the chroma components. For example, along the direction from the first sub-block area to the second sub-block area, the first weight coefficient "a" of the chroma component of each sub-block is respectively 7/8, 4/8, 1/8 in sequence. For example, referring to FIG. 6C, the first weight coefficient "a" of the chroma component of sub-block 7 is 7/8, the first weight coefficient "a" of the chroma component of sub-block 4 is 4/8, and the first weight coefficient "a" of the chroma component of sub-block 1 is 1/8.

In another example, for the sub-blocks in the third sub-block area, a second set of weight coefficients can be configured for the chroma components. For example, along the direction from the first sub-block area to the second sub-block area, the first weight coefficient "a" of the chroma component of each sub-block is respectively 6/8, 4/8, and 2/8 in sequence. For example, referring to FIG. 6C, the first weight coefficient "a" of the chroma component of sub-block 7 is 6/8, the first weight coefficient "a" of the chroma component of sub-block 4 is 4/8, and the first weight coefficient "a" of the chroma component of sub-block 1 is 2/8. For the chroma components, the first prediction value P1 and the second prediction value P2 are both the prediction values of the chroma component, and the prediction value P1*a+P2*b after weighted compensation is also the prediction value of the chroma component.

Some examples of the motion compensation process will be described below.

Example 1. For motion compensation, the current block can be partitioned into a first sub-block area, a second sub-block area, and a third sub-block area. Motion compensation is performed on each sub-block in the first sub-block area based on first target motion information of the first triangular sub-block. Motion compensation is performed on each sub-block in the second sub-block area based on second target motion information of the second triangular sub-block. Weighted compensation is performed on each sub-block in the third sub-block area based on the first target motion information and the second target motion information.

In an example, the current block can be partitioned into multiple M*M (e.g., M is 4) sub-blocks. For each M*M sub-block, if the sub-block is not across the diagonal separating the first triangular sub-block from the second triangular sub-block, unidirectional motion information is used to perform motion compensation on the sub-block. In this case, if the sub-block is located in the first triangular sub-block, the sub-block is referred to as the first sub-block area, and the first target motion information is used for motion compensation; if the sub-block is located in the second triangular sub-block, the sub-block is referred to as the second sub-block area and the second target motion information is used for motion compensation. If the sub-block is across the diagonal separating the first triangle sub-block from the second triangle sub-block, the sub-block is referred to as the third sub-block area, for which the two kinds of unidirectional motion information (that is, the first target motion information and the second target motion information) can be used to perform weighted compensation. For specific weight calculating methods, reference can be made to the above examples.

Example 2. For motion compensation, the current block can be partitioned into a first sub-block area, a second sub-block area, and a third sub-block area. Motion compensation is performed on each sub-block in the first sub-block area based on the first target motion information of the first triangular sub-block. Motion compensation is performed on each sub-block in the second sub-block area based on the second target motion information of the second triangular sub-block. Based on the first target motion information and the second target motion information, weighted compensation is performed on each sub-block in the third sub-block area, where only one set of weight coefficients is used: the weight coefficients used for the luma components: {7/8, 6/8, 4/8, 2/8, 1/8}, the weight coefficient used for chroma components: {7/8, 4/8, 1/8}. For specific weight calculating methods, reference can be made to the above example.

Example 3: For motion compensation, the current block can be partitioned into a first sub-block area, a second sub-block area, and a third sub-block area. Motion compensation is performed on each sub-block in the first sub-block area based on the first target motion information of the first triangular sub-block. Motion compensation is performed on each sub-block in the second sub-block area based on the second target motion information of the second triangular sub-block. Based on the first target motion information and the second target motion information, weighted compensation is performed on each sub-block in the third sub-block area, where only one set of weight coefficients can be configured for the weighted compensation. For example, the weight coefficients for the luma component are configured as follows: {7/8, 6/8, 5/8, 4/8, 3/8, 2/8, 1/8}, and the weight coefficient for the chroma component are configured as follows: {6/8, 4/8, 2/8}. For specific weighting methods, refer to the above example.

Approach 3. The current block is partitioned into a first sub-block area, a second sub-block area and a third sub-block area, where the first sub-block area is located in the first triangular sub-block, and the second sub-block area is located in the second triangle sub-block, the distance between the center of each sub-block in the third sub-block area and the diagonal line separating the first triangle sub-block from the second triangle sub-block is less than a preset threshold. Motion compensation is performed on each sub-block in the first sub-block area based on the first target motion information. Motion compensation is performed on each sub-block in the second sub-block area based on the second target motion information. Motion compensation is performed on each sub-block in the third sub-block area based on the first target motion information or the second target motion information.

For example, if size information of the current block satisfies a first condition (for example, the width of the current block is greater than or equal to the height of the current block), motion compensation is performed on each sub-block in the third sub-block area based on the first target motion information: if size information of the current block satisfies a second condition (for example, the width of the current block is less than the height of the current block), motion compensation is performed on each sub-block in the third sub-block area based on the second target motion information. However, the above is only an example, and other methods can also be used to determine whether to perform motion compensation based on the first target motion information or the second target motion information.

Each sub-block in the third sub-block area can be a 1*1 sub-block, that is, a single pixel block, or it can be an N*M sub-block, where N can be greater than or equal to 1, and M can also be greater than or equal to 1.

In this example, for the third sub-block area, instead of using both the first target motion information and the second target motion information, but the first target motion information or the second target motion information is used for motion compensation on each sub-block in the third sub-block area. That is, there are no sub-blocks to be subjected to motion compensation using bidirectional prediction, so weighted compensation is not required.

As for whether to use the first target motion information or the second target motion information to perform motion compensation on each sub-block in the third sub-block area it can be determined in any of the following ways: (1) using the first target motion information by default to perform motion compensation on each sub-block in the third sub-block area; (2) using the second target motion information by default to perform motion compensation in the third sub-block area: (3) determining based on the size of the current block. For example, if the width of the current block is greater than or equal to the height of the current block, the first target motion information is used to perform motion compensation on each sub-block in the third sub-block area; if the width of the current block is less than the height of the current block, the second target motion information is used to perform motion compensation on each sub-block in the third sub-block area.

Implementation 9

The video encoder first determines whether the current block satisfies specific conditions for enabling the geometric partitioning mode with triangular partition. If not, it is decided not to use the geometric partitioning mode with triangular partition, but use other mode. If so, the video encoder can enable the geometric partitioning mode with triangular partition by default, or the video encoder can determine whether to enable the geometric partitioning mode with triangular partition. If the video encoder enables the geometric partitioning mode with triangular partition by default or decides to enable the geometric partitioning mode with triangular partition, the video encoder performs the operation of partitioning the current block into triangular sub-blocks and other subsequent operations in the above related examples; otherwise, these operations are not performed.

In order to determine whether to enable the geometric partitioning mode with triangular partition, the video encoder can determine the rate distortion cost corresponding to the geometric partitioning mode with triangular partition. If the rate distortion cost corresponding to the geometric partitioning mode with triangular partition is less than the rate distortion cost corresponding to each of the other modes, it can be determined to enable the geometric partitioning mode with triangular partition; otherwise, it can be determined not to enable the geometric partitioning mode with triangular partition.

Correspondingly, the encoded bit stream sent by the video encoder to the decoder can carry seventh indication information, where the seventh indication information specifies that the geometric partitioning mode with triangular partition is enabled.

The video decoder first determines whether the current block satisfies the specific conditions for enabling the geometric partitioning mode with triangular partition. If not, it is decided not to use the geometric partitioning mode with triangular partition, but use other mode. If so, the video decoder can enable the geometric partitioning mode with triangular partition by default, or the video decoder is configured to derive the encoded bit stream from the encoder. If the encoded bit stream carries the seventh indication information, it can be determined to enable the geometric partitioning mode with triangular partition; otherwise, it can be determined not to enable the geometric partitioning mode with triangular partition. If the video decoder enables the geometric partitioning mode with triangular partition by default or decides to enable the geometric partitioning mode with triangular partition, the video decoder performs the operation of partitioning the current block into triangular sub-blocks and other subsequent operations in the above related examples; otherwise, these operations are not performed.

Implementation 10

The video encoder/video decoder can also store the first target motion information and the second target motion information as follows. If the candidate block corresponding to the first target motion information is a unidirectional prediction block, the first target motion information is stored for the first triangle sub-block; if the candidate block corresponding to the first target motion information is a bidirectional prediction block, the first target motion information and third target motion information is stored for the first triangle sub-block, and the third target motion information is another motion information of the bidirectional prediction block. If the candidate block corresponding to the second target motion information is a unidirectional prediction block, the second target motion information is stored for the second triangle sub-block, if the candidate block corresponding to the second target motion information is a bidirectional prediction block, the second target motion information and fourth target motion information is stored for the second triangle sub-block, and the fourth target motion information is another motion information of the bidirectional prediction block.

Figures 6C, 7A, 7B:
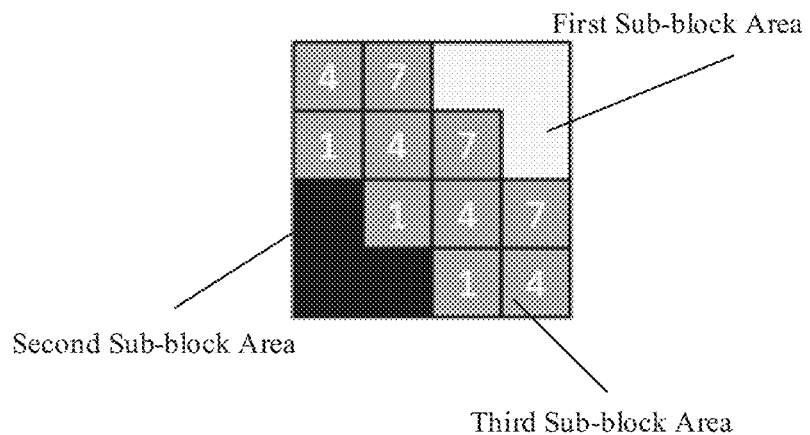
FIGS. 7A to 7B are schematic diagrams of motion information storage according to an example of the present disclosure.

For example, for the first sub-block area, if the first target motion information of the first sub-block area is MV1, and MV1 comes from a unidirectional prediction block R1, that is, the unidirectional prediction block R1 is a candidate block of the current block, and the motion information list includes the motion information MV1 of the unidirectional prediction block R1, and MV1 is selected as the first target motion information of the first sub-block area, then MV1 is stored for the first sub-block area, as shown in FIG. 7A. For the second sub-block area, if the second target motion information of the second sub-block area is MV2, and MV2 comes from a unidirectional prediction block R2, that is, the unidirectional prediction block R2 is a candidate block of the current block, and the motion information list includes the motion information MV2 of the unidirectional prediction block R2, and MV2 is selected as the second target motion information of the second sub-block area, then MV2 is stored for the second sub-block area, as shown in FIG. 7A.

For another example, for the first sub-block area, if the first target motion information of the first sub-block area is MV1, and MV1 comes from a bidirectional prediction block R3, that is, the bidirectional prediction block R3 is a candidate block of the current block, and the motion information list includes the motion information MV1 and MV2 of the bidirectional prediction block R3, and MV1 is selected as the first target motion information of the first sub-block area, then MV1 and MV2, rather than only MI, are stored for the first sub-block area, as shown in FIG. 7B. For the second sub-block area, if the second target motion information of the second sub-block area is MV3, and MV3 comes from a bidirectional prediction block R4, that is, the bidirectional prediction block R4 is a candidate block of the current block, and the motion information list includes the motion information MV3 and MV4 of the bidirectional prediction block R4, and MV3 is selected as the second target motion information of the second sub-block area, then MV3 and MV4, rather than only MV3, are stored for the second sub-block area, as shown in FIG. 7B.

In the above examples, as shown in FIGS. 7A and 7B, the motion information can be stored in a unit of 4*4.

Implementation 11

Figure 8:
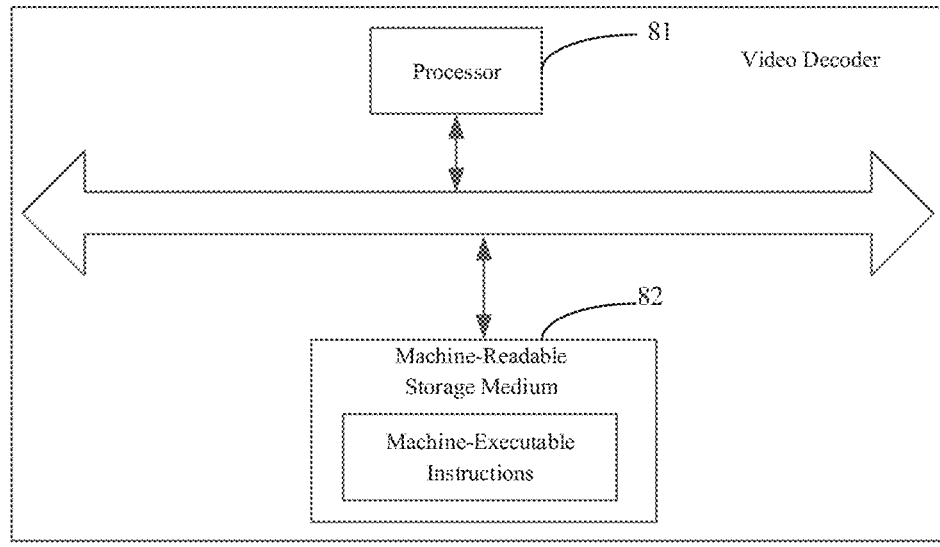
FIG. 8 is a schematic block diagram of a video decoder according to an example of the present disclosure.

This example of the present disclosure provides a video decoder. FIG. 8 is a schematic block diagram of the video decoder. Referring to FIG. 8, the video decoder can include a processor 81 and a machine-readable storage medium 82. The machine-readable storage medium 82 stores machine-executable instructions that can be invoked by the processor 81. When the processor 81 invokes the machine-executable instructions, the processor 81 is configured to perform the video decoding method according to the above related examples of the present disclosure.

Figure 9:
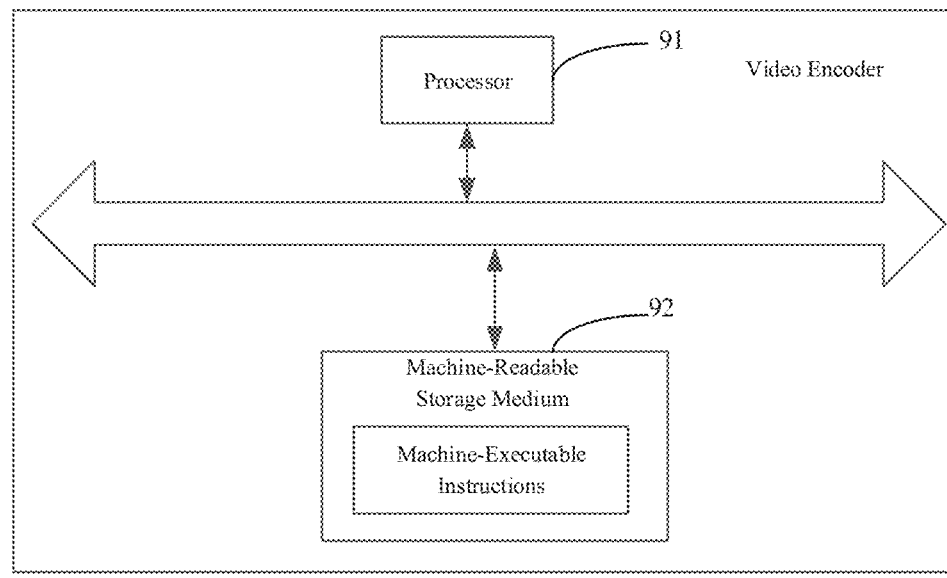
FIG. 9 is a schematic block diagram of a video encoder according to an example of the present disclosure.

The example of the present disclosure also provides a video encoder. FIG. 9 is a schematic block diagram of the video encoder. Referring to FIG. 9, the video encoder can include a processor 91 and a machine-readable storage medium 92. The machine-readable storage medium 92 stores machine-executable instructions that can be invoked by the processor 91. When the processor 91 invokes the machine-executable instructions, the processor 91 is configured to perform the video encoding method according to the above related examples of the present disclosure.

An example of the present disclosure also provides a machine-readable storage medium, which stores computer instructions, and when the computer instructions are executed by a processor, the processor can implement the video encoding/decoding method of the above examples.

The machine-readable storage medium can be an electronic, magnetic, optical, or other physical storage device, and can contain or store information, such as executable instructions, data, and so on. For example, the machine-readable storage medium can include volatile memory (for example, RAM (Random Access Memory)), non-volatile memory (for example, flash memory, storage drive (such as hard disk drive), solid state drive, optical storage (for example, CD-ROM (Compact Disc Read-Only Memory), DVD (Digital Versatile Disc), etc.) or a combination thereof.

The systems, apparatuses, modules, or units illustrated in the above examples can be implemented by computer chips or entities, or implemented by products with certain functions. A typical implementation device is an electronic device, including but not limited to: a personal computer, a laptop computer, a tablet computer, a cellular phone, a camera, a smart phone, a personal digital assistant, a media player, a navigation device, an email receiving and sending device, a game console, a wearable device, or any combination thereof.

For the convenience of description, when describing the above apparatus, the functions are partitioned into various units. However, when implementing the present disclosure, the functions of each unit can be implemented in one or more software and/or hardware.

Those skilled in the art should understand that the examples of the present disclosure can be provided as methods, systems, or computer program products. Therefore, the present disclosure can adopt the form of a pure hardware implementation, a pure software implementation, or an implementation combining software and hardware.

The present disclosure is described with reference to flowcharts and/or block diagrams of methods, devices (systems), and computer program products according to examples of the present disclosure. It should be understood that each process and/or block in the flowchart and/or block diagram can be implemented by computer program instructions. These computer program instructions can be provided to the processor of a general-purpose computer, a special-purpose computer, an embedded processor, or other programmable data processing device, so that the computer program instructions are executed by the processor to generate a device for implementing functions specified in one or more processes in the flowchart and/or in one or more blocks in the block diagram.

The above descriptions are only some examples of the present disclosure, and are not used to limit the present disclosure. For those skilled in the art, the present disclosure can have various modifications and changes. Any modification, equivalent replacement, improvement, etc. made within the spirit and principle of the present disclosure shall be included in the scope of the claims of the present disclosure.

What is claimed is:

1. A decoding method, comprising:
   determining whether a current block satisfies specific conditions for enabling a geometric partitioning mode with triangular partition; and
   if the current block satisfies the specific conditions for enabling the geometric partitioning mode with triangular partition and the geometric partitioning mode with triangular partition is enabled, performing operations comprising:
      obtaining first target motion information and second target motion information of the current block, wherein the first target motion information is different from the second target motion information; and
      performing a decoding process on the current block based on the first target motion information and the second target motion information;
   wherein determining whether the current block satisfies the specific conditions for enabling the geometric partitioning mode with triangular partition comprises: determining whether a type of a current slice where the current block is located, a motion information mode of the current block, and size information of the current block satisfy the specific conditions;
   wherein performing the decoding process on the current block based on the first target motion information and the second target motion information comprises: performing motion compensation on the current block based on the first target motion information and the second target motion information to obtain a prediction value of the current block;
   wherein the prediction value of the current block at least comprises a prediction value of a first sub-block area, a prediction value of a second sub-block area, and a prediction value of a third sub-block area;
   wherein the prediction value of the first sub-block area is obtained by performing motion compensation on the first sub-block area based on the first target motion information, the prediction value of the second sub-block area is obtained by performing motion compensation on the second sub-block area based on the second target motion information, and the prediction value of the third sub-block area is obtained by performing weighted compensation on the third sub-block area based on the first target motion information and the second target motion information; and wherein the prediction value of the third sub-block area comprises prediction values of all sub-blocks in the third sub-block area, and each sub-block in the third sub-block area is a 1*1 pixel block, and wherein obtaining the prediction value of the third sub-block area by performing the weighted compensation on the third sub-block area based on the first target motion information and the second target motion information comprises:

for each sub-block in the third sub-block area,
determining a first prediction value of the sub-block based on the first target motion information;
determining a second prediction value of the sub-block based on the second target motion information; and
obtaining a weighted prediction value of the sub-block based on the first prediction value, a first weight coefficient corresponding to the first prediction value, the second prediction value, and a second weight coefficient corresponding to the second prediction value,
wherein the weighted prediction value of the sub-block is P1*a+P2*b when the first prediction value is P1, the second prediction value is P2, the first weight coefficient is a, and the second weight coefficient is b.

2. The decoding method according to claim 1, wherein the first target motion information and the second target motion information are respectively motion information of a first triangular sub-block and a second triangular sub-block obtained by partitioning the current block, and wherein the operations further comprise:
partitioning the current block into the first triangular sub-block and the second triangular sub-block based on a partition method indicated by indication information.

3. The decoding method according to claim 2, wherein partitioning the current block into the first triangular sub-block and the second triangular sub-block based on the partition method indicated by the indication information comprises one of:

partitioning the current block into the first triangular sub-block and the second triangular sub-block with a first diagonal method if the partition method indicated by the indication information specifies that the current block is allowed to be partitioned with the first diagonal method; or
partitioning the current block into the first triangular sub-block and the second triangular sub-block with a second diagonal method if the partition method indicated by the indication information specifies that the current block is allowed to be partitioned with the second diagonal method.

4. The decoding method according to claim 1, wherein a set of values of the first weight coefficient is {⅞, ⅝, ⅝, ⅘, ⅜, ⅖, ⅛}, and a sum of the first weight coefficient and the second weight coefficient equals to 1.

5. The decoding method according to claim 1, wherein if the current block enables a general merge mode of a sub-block partition mode or a general merge mode of a multi-hypothesis mode with inter-picture merge and intra-picture prediction, the current block does not satisfy the specific conditions.

6. The decoding method according to claim 1, comprising: determining that the current block satisfies the specific conditions by at least one of:

determining that a type of a current slice where the current block is located is equal to B; or
determining that a width of the current block is greater than or equal to 8, and a height of the current block is greater than or equal to 8.

7. The decoding method according to claim 1, wherein the current block does not satisfy the specific conditions if at least one of following restrictions is not satisfied, the restrictions comprising:

a type of a current slice where the current block is located is equal to B; and
a width of the current block is greater than or equal to 8, and a height of the current block is greater than or equal to 8.

8. The decoding method according to claim 1, wherein obtaining the first target motion information and the second target motion information of the current block, comprises one of:

constructing a candidate list which comprises a plurality of candidate motion information; selecting one candidate motion information from the candidate list as the first target motion information; and selecting another candidate motion information from the candidate list as the second target motion information; or
constructing a candidate list which comprises a plurality of candidate motion information; selecting, according to an index value indicated by third indication information, candidate motion information corresponding to the index value from the candidate list, and using the selected candidate motion information as the first target motion information; and selecting, according to an index value indicated by fourth indication information, candidate motion information corresponding to the index value from the candidate list, and using the selected candidate motion information as the second target motion information.

9. An encoding method, comprising:
determining whether a current block satisfies specific conditions for enabling a geometric partitioning mode with triangular partition; and
if the current block satisfies specific conditions for enabling the geometric partitioning mode with triangular partition and the geometric partitioning mode with triangular partition is enabled, performing operations comprising:
obtaining first target motion information and second target motion information of the current block, wherein the first target motion information is different from the second target motion information; and
performing an encoding process on the current block based on the first target motion information and the second target motion information;
wherein determining whether the current block satisfies the specific conditions for enabling the geometric partitioning mode with triangular partition comprises: determining whether a type of a current slice where the current block is located, a motion information mode of the current block, and size information of the current block satisfy the specific conditions;
wherein performing the encoding process on the current block based on the first target motion information and the second target motion information comprises: performing motion compensation on the current block based on the first target motion information and the second target motion information to obtain a prediction value of the current block;

wherein the prediction value of the current block at least comprises a prediction value of a first sub-block area, a prediction value of a second sub-block area, and a prediction value of a third sub-block area;

wherein the prediction value of the first sub-block area is obtained by performing motion compensation on the first sub-block area based on the first target motion information, the prediction value of the second sub-block area is obtained by performing motion compensation on the second sub-block area based on the second target motion information, and the prediction value of the third sub-block area is obtained by performing weighted compensation on the third sub-block area based on the first target motion information and the second target motion information; and wherein the prediction value of the third sub-block area comprises prediction values of all sub-blocks in the third sub-block area, and each sub-block in the third sub-block area is a 1*1 pixel block, and wherein obtaining the prediction value of the third sub-block area by performing the weighted compensation on the third sub-block area based on the first target motion information and the second target motion information comprises:

for each sub-block in the third sub-block area,
  determining a first prediction value of the sub-block based on the first target motion information;
  determining a second prediction value of the sub-block based on the second target motion information; and
  obtaining a weighted prediction value of the sub-block based on the first prediction value, a first weight coefficient corresponding to the first prediction value, the second prediction value, and a second weight coefficient corresponding to the second prediction value,
  wherein the weighted prediction value of the sub-block is P1*a+P2*b when the first prediction value is P1, the second prediction value is P2, the first weight coefficient is a, and the second weight coefficient is b.

10. The encoding method according to claim 9, wherein the first target motion information and the second target motion information are respectively motion information of a first triangular sub-block and a second triangular sub-block obtained by partitioning the current block; and
  wherein the operations further comprise:
    encoding indication information configured to indicate a partition method of the current block, wherein the partition method indicated by the indication information is configured to partition the current block into the first triangular sub-block and the second triangular sub-block.

11. The encoding method according to claim 10, wherein the partition method indicated by the indication information being configured to partition the current block into the first triangular sub-block and the second triangular sub-block comprises:
  if the indication information specifies that the current block is allowed to be partitioned with a first diagonal method, the indication information is configured to specify partitioning the current block into the first triangular sub-block and the second triangular sub-block with the first diagonal method; or
  if the indication information specifies that the current block is allowed to be partitioned with a second diagonal method, the indication information is configured to indicate partitioning the current block into the first triangular sub-block and the second triangular sub-block with the second diagonal method.

12. The encoding method according to claim 9, wherein a set of values of the first weight coefficient is {7/8, 6/8, 5/8, 4/8, 3/8, 2/8, 1/8}, and
  a sum of the first weight coefficient and the second weight coefficient equals to 1.

13. The encoding method according to claim 9, wherein, if the current block enables a general merge mode of a sub-block partition mode or a general merge mode of a multi-hypothesis mode with inter-picture merge and intra-picture prediction, the current block does not satisfy the specific conditions.

14. The encoding method according to claim 9, comprising: determining that the current block satisfies the specific conditions by at least one of:
  determining that a type of a current slice where the current block is located is equal to B; or
  determining that a width of the current block is greater than or equal to 8, and a height of the current block is greater than or equal to 8.

15. The encoding method according to claim 9, wherein the current block does not satisfy the specific conditions if at least one of following restrictions is not satisfied, the restrictions comprising:
  a type of a current slice where the current block is located is equal to B; and
  a width of the current block is greater than or equal to 8, and a height of the current block is greater than or equal to 8.

16. The encoding method according to claim 9, wherein obtaining the first target motion information and the second target motion information of the current block, comprises one of:
  constructing a candidate list which comprises a plurality of candidate motion information; selecting one candidate motion information from the candidate list as the first target motion information; and selecting another candidate motion information from the candidate list as the second target motion information; or
  constructing a candidate list which comprises a plurality of candidate motion information; selecting, according to an index value indicated by third indication information, candidate motion information corresponding to the index value from the candidate list, and using the selected candidate motion information as the first target motion information; and selecting, according to an index value indicated by fourth indication information, candidate motion information corresponding to the index value from the candidate list, and using the selected candidate motion information as the second target motion information.

17. A decoding device, comprising:
  at least one processor; and
  at least one non-transitory machine-readable storage medium storing machine-executable instructions executable by the at least one processor to:
    determine whether a current block satisfies specific conditions for enabling a geometric partitioning mode with triangular partition; and
    in response to determining that the current block satisfies the specific conditions for enabling a geometric partitioning mode with triangular partition and that the geometric partitioning mode with triangular partition is enabled, perform operations comprising:
      obtaining first target motion information and second target motion information of the current block, wherein the first target motion information is different from the second target motion information; and performing a decoding process on the current block based on the first target motion information and the second target motion information;

wherein determining whether the current block satisfies the specific conditions for enabling the geometric partitioning mode with triangular partition comprises: determining whether a type of a current slice where the current block is located, a motion information mode of the current block, and size information of the current block satisfy the specific conditions;

wherein performing the decoding process on the current block based on the first target motion information and the second target motion information comprises:

performing motion compensation on the current block based on the first target motion information and the second target motion information to obtain a prediction value of the current block;

wherein the prediction value of the current block at least comprises a prediction value of a first sub-block area, a prediction value of a second sub-block area, and a prediction value of a third sub-block area;

wherein the prediction value of the first sub-block area is obtained by performing motion compensation on the first sub-block area based on the first target motion information, the prediction value of the second sub-block area is obtained by performing motion compensation on the second sub-block area based on the second target motion information, and the prediction value of the third sub-block area is obtained by performing weighted compensation on the third sub-block area based on the first target motion information and the second target motion information; and wherein the prediction value of the third sub-block area comprises prediction values of all sub-blocks in the third sub-block area, and each sub-block in the third sub-block area is a 1*1 pixel block, and wherein obtaining the prediction value of the third sub-block area by performing the weighted compensation on the third sub-block area based on the first target motion information and the second target motion information comprises:

for each sub-block in the third sub-block area,
  determining a first prediction value of the sub-block based on the first target motion information;
  determining a second prediction value of the sub-block based on the second target motion information; and
  obtaining a weighted prediction value of the sub-block based on the first prediction value, a first weight coefficient corresponding to the first prediction value, the second prediction value, and a second weight coefficient corresponding to the second prediction value,
  wherein the weighted prediction value of the sub-block is P1*a+P2*b when the first prediction value is P1, the second prediction value is P2, the first weight coefficient is a, and the second weight coefficient is b.

18. An encoding device, comprising:
at least one processor; and
at least one non-transitory machine-readable storage medium storing machine-executable instructions that are executable by the at least one processor to:

determine whether a current block satisfies specific conditions for enabling a geometric partitioning mode with triangular partition; and in response to determining that the current block satisfies the specific conditions for enabling the geometric partitioning mode with triangular partition and that the geometric partitioning mode with triangular partition is enabled, perform operations comprising:

obtaining first target motion information and second target motion information of the current block, wherein the first target motion information is different from the second target motion information; and performing an encoding process on the current block based on the first target motion information and the second target motion information;

wherein the characteristic information at least comprises determining whether the current block satisfies the specific conditions for enabling the geometric partitioning mode with triangular partition comprises: determining whether a type of a current slice where the current block is located, a motion information mode of the current block, and size information of the current block satisfy the specific conditions;

wherein performing the encoding process on the current block based on the first target motion information and the second target motion information comprises:

performing motion compensation on the current block based on the first target motion information and the second target motion information to obtain a prediction value of the current block;

wherein the prediction value of the current block at least comprises a prediction value of a first sub-block area, a prediction value of a second sub-block area, and a prediction value of a third sub-block area;

wherein the prediction value of the first sub-block area is obtained by performing motion compensation on the first sub-block area based on the first target motion information, the prediction value of the second sub-block area is obtained by performing motion compensation on the second sub-block area based on the second target motion information, and the prediction value of the third sub-block area is obtained by performing weighted compensation on the third sub-block area based on the first target motion information and the second target motion information; and wherein the prediction value of the third sub-block area comprises prediction values of all sub-blocks in the third sub-block area, and each sub-block in the third sub-block area is a 1*1 pixel block, and wherein obtaining the prediction value of the third sub-block area by performing the weighted compensation on the third sub-block area based on the first target motion information and the second target motion information comprises:

for each sub-block in the third sub-block area,
  determining a first prediction value of the sub-block based on the first target motion information;
  determining a second prediction value of the sub-block based on the second target motion information; and
  obtaining a weighted prediction value of the sub-block based on the first prediction value, a first weight coefficient corresponding to the first prediction value, the second prediction value, and a second weight coefficient corresponding to the second prediction value, wherein the weighted prediction value of the sub-block is P1*a+P2*b when the first prediction value is P1, the second prediction value is P2, the first weight coefficient is a, and the second weight coefficient is b.

19. A decoder, configured to:

determine whether a current block satisfies specific conditions for enabling a geometric partitioning mode with triangular partition; and in response to determining that a current block satisfies specific conditions for enabling a geometric partitioning mode with triangular partition and the geometric partitioning mode with triangular partition is enabled, perform operations comprising:

obtaining first target motion information and second target motion information of the current block, wherein the first target motion information is different from the second target motion information; and performing a decoding process on the current block based on the first target motion information and the second target motion information;

wherein determining whether the current block satisfies the specific conditions for enabling the geometric partitioning mode with triangular partition comprises:

determining whether a type of a current slice where the current block is located, a motion information mode of the current block, and size information of the current block satisfy the specific conditions;

wherein the performing a decoding process on the current block based on the first target motion information and the second target motion information, comprises: performing motion compensation on the current block based on the first target motion information and the second target motion information to obtain a prediction value of the current block;

wherein the prediction value of the current block at least comprises a prediction value of a first sub-block area, a prediction value of a second sub-block area, and a prediction value of a third sub-block area;

wherein the prediction value of the first sub-block area is obtained by performing motion compensation on the first sub-block area based on the first target motion information, the prediction value of the second sub-block area is obtained by performing motion compensation on the second sub-block area based on the second target motion information, and the prediction value of the third sub-block area is obtained by performing weighted compensation on the third sub-block area based on the first target motion information and the second target motion information; and wherein the prediction value of the third sub-block area comprises prediction values of all sub-blocks in the third sub-block area, and each sub-block in the third sub-block area is a 1*1 pixel block, and wherein obtaining the prediction value of the third sub-block area by performing the weighted compensation on the third sub-block area based on the first target motion information and the second target motion information comprises:

for each sub-block in the third sub-block area,
determining a first prediction value of the sub-block based on the first target motion information;

determining a second prediction value of the sub-block based on the second target motion information; and obtaining a weighted prediction value of the sub-block based on the first prediction value, a first weight coefficient corresponding to the first prediction value, the second prediction value, and a second weight coefficient corresponding to the second prediction value, wherein the weighted prediction value of the sub-block is P1*a+P2*b when the first prediction value is P1, the second prediction value is P2, the first weight coefficient is a, and the second weight coefficient is b.

20. A non-transitory machine-readable storage medium storing machine-readable instructions that are executable by at least one processor to:

determine whether a current block satisfies specific conditions for enabling a geometric partitioning mode with triangular partition; and in response to determining that the current block satisfies the specific conditions for enabling a geometric partitioning mode with triangular partition and that the geometric partitioning mode with triangular partition, perform operations comprising:

obtaining first target motion information and second target motion information of the current block, wherein the first target motion information is different from the second target motion information; and performing an encoding process on the current block based on the first target motion information and the second target motion information;

wherein determining whether the current block satisfies the specific conditions for enabling the geometric partitioning mode with triangular partition comprises:

determining whether a type of a current slice where the current block is located, a motion information mode of the current block, and size information of the current block satisfy the specific conditions;

wherein performing the encoding process on the current block based on the first target motion information and the second target motion information comprises: performing motion compensation on the current block based on the first target motion information and the second target motion information to obtain a prediction value of the current block;

wherein the prediction value of the current block at least comprises a prediction value of a first sub-block area, a prediction value of a second sub-block area, and a prediction value of a third sub-block area;

wherein the prediction value of the first sub-block area is obtained by performing motion compensation on the first sub-block area based on the first target motion information, the prediction value of the second sub-block area is obtained by performing motion compensation on the second sub-block area based on the second target motion information, and the prediction value of the third sub-block area is obtained by performing weighted compensation on the third sub-block area based on the first target motion information and the second target motion information; and wherein the prediction value of the third sub-block area comprises prediction values of all sub-blocks in the third sub-block area, and each sub-block in the third sub-block area is a 1*1 pixel block, wherein obtaining the prediction value of the third sub-block area by performing the weighted compensation on the third sub-block area based on the first target motion information and the second target motion information comprises:

for each sub-block in the third sub-block area,
- determining a first prediction value of the sub-block based on the first target motion information;
- determining a second prediction value of the sub-block based on the second target motion information; and
- obtaining a weighted prediction value of the sub-block based on the first prediction value, a first weight coefficient corresponding to the first prediction value, the second prediction value, and a second weight coefficient corresponding to the second prediction value,
- wherein the weighted prediction value of the sub-block is P1*a+P2*b when the first prediction value is P1, the second prediction value is P2, the first weight coefficient is a, and the second weight coefficient is b.

* * * * *